(12) United States Patent
Futaki et al.

(10) Patent No.: US 10,231,142 B2
(45) Date of Patent: Mar. 12, 2019

(54) RADIO COMMUNICATION SYSTEM, RADIO TERMINAL, RADIO NETWORK, RADIO COMMUNICATION METHOD AND PROGRAM

(71) Applicants: Hisashi Futaki, Tokyo (JP); Kosei Kobayashi, Tokyo (JP); Hiroaki Aminaka, Tokyo (JP)

(72) Inventors: Hisashi Futaki, Tokyo (JP); Kosei Kobayashi, Tokyo (JP); Hiroaki Aminaka, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 0 days.

(21) Appl. No.: 14/610,384

(22) Filed: Jan. 30, 2015

(65) Prior Publication Data
US 2015/0141054 A1    May 21, 2015

Related U.S. Application Data

(62) Division of application No. 13/519,268, filed as application No. PCT/JP2011/050048 on Jan. 5, 2011, now abandoned.

(30) Foreign Application Priority Data

Jan. 7, 2010   (JP) ................................ 2010-002366

(51) Int. Cl.
*H04W 24/08* (2009.01)
*H04W 64/00* (2009.01)
(Continued)

(52) U.S. Cl.
CPC ......... *H04W 24/08* (2013.01); *H04L 41/0631* (2013.01); *H04W 52/0216* (2013.01);
(Continued)

(58) Field of Classification Search
CPC ..... H04W 24/10; H04W 24/02; H04W 24/00; H04W 72/1278; H04J 3/14; H04B 17/24; H04B 17/309
See application file for complete search history.

(56) References Cited

U.S. PATENT DOCUMENTS 6,810,236 B2   10/2004   Terry et al.
7,177,658 B2    2/2007   Willenegger et al.
(Continued)

FOREIGN PATENT DOCUMENTS

CN       1801669 A    7/2006
CN     101176010 A    5/2008
(Continued)

OTHER PUBLICATIONS

"Email discussion summary [66b#7] :LTE-UMTS: Minimisation of drive tests", Qualcomm Euope, 3GPP TSG-RAN WG2 meeting #67, Shenzhen, China, Aug. 24-28, 2009, R2-094291, pp. 1-35.
(Continued)

*Primary Examiner* — Lewis G West
(74) *Attorney, Agent, or Firm* — Sughrue Mion, PLLC

(57) ABSTRACT

A wireless communication system comprises: a setting notifying means for notifying, to a radio terminal, setting information related to at least one of the radio terminal's collection of measurement information and the radio terminal's reporting of the measurement information to a radio network; a status notifying means for notifying, to the radio network, a status related to at least one of the radio terminal's collection of the measurement information and the radio terminal's reporting of the measurement information; and a re-establishing means for receiving the status and determining whether to re-establish the setting information.

14 Claims, 21 Drawing Sheets

(51) Int. Cl.
H04L 12/24 (2006.01)
H04W 52/02 (2009.01)
H04W 76/19 (2018.01)
H04W 88/02 (2009.01)
H04W 48/08 (2009.01)
H04W 28/06 (2009.01)
H04W 24/10 (2009.01)
H04W 24/02 (2009.01)

(52) U.S. Cl.
CPC ..... *H04W 52/0261* (2013.01); *H04W 64/006* (2013.01); *H04W 24/02* (2013.01); *H04W 24/10* (2013.01); *H04W 28/06* (2013.01); *H04W 48/08* (2013.01); *H04W 76/19* (2018.02); *H04W 88/02* (2013.01); *Y02D 70/00* (2018.01); *Y02D 70/1242* (2018.01); *Y02D 70/1262* (2018.01); *Y02D 70/146* (2018.01); *Y02D 70/164* (2018.01)

(56) References Cited

U.S. PATENT DOCUMENTS

| | | |
|---|---|---|
| 2002/0168944 A1 | 11/2002 | Terry et al. |
| 2003/0207696 A1 | 11/2003 | Willenegger et al. |
| 2006/0217152 A1 | 9/2006 | Fok et al. |
| 2007/0004376 A1 | 1/2007 | Kogure |
| 2008/0207195 A1 | 8/2008 | Ranta et al. |
| 2009/0023436 A1 | 1/2009 | Wu |
| 2009/0247149 A1 | 10/2009 | Lee et al. |
| 2009/0257353 A1 | 10/2009 | Song et al. |
| 2011/0264784 A1 | 10/2011 | Power et al. |

FOREIGN PATENT DOCUMENTS

| | | |
|---|---|---|
| CN | 101557615 A | 10/2009 |
| CN | 101610521 A | 12/2009 |
| EP | 2 028 894 A1 | 2/2009 |
| EP | 2122929 A2 | 11/2009 |
| EP | 2302968 A2 | 3/2011 |
| EP | 2582179 A1 | 4/2013 |
| JP | 06-350602 A | 12/1994 |
| JP | 08-328970 A | 12/1996 |
| JP | 2000-244510 A | 9/2000 |
| JP | 2001-075897 A | 3/2001 |
| JP | 2002-271833 A | 9/2002 |
| JP | 2004-166056 A | 6/2004 |
| JP | 2005-341176 A | 12/2005 |
| JP | 2006-191455 A | 7/2006 |
| JP | 2006-520170 A | 8/2006 |
| JP | 2008-306240 A | 12/2008 |
| JP | 2009-10843 A | 1/2009 |
| JP | 2009-177576 A | 8/2009 |
| JP | 2009284252 A | 12/2009 |
| JP | 2012-225666 A | 11/2012 |
| WO | 2004/082094 A2 | 9/2004 |
| WO | 2008/087535 A2 | 7/2008 |
| WO | 2008/153081 A1 | 12/2008 |
| WO | 2008/157800 A1 | 12/2008 |
| WO | 2009/011064 A1 | 1/2009 |
| WO | 2009064716 A1 | 5/2009 |
| WO | 2009066622 A1 | 5/2009 |
| WO | 2009/072286 A1 | 6/2009 |
| WO | 2009/088739 A1 | 7/2009 |
| WO | 2009/117443 A1 | 9/2009 |
| WO | 2010/074630 A1 | 7/2010 |

OTHER PUBLICATIONS

"3rd generattion Partnership Project; Technical Specification Group Radio Access Network; Study on Minimization of drive-tests in Next Generation Networks; (Release 9)", Aug. 2009, 3GPP TR 36.805, V1.2.0, pp. 1-18.

Office Action dated Apr. 3, 2013 issued by the Japanese Patent Office in corresponding Japanese Patent Application No. 2013-032385.

Kyocera, "Some considerations for logged MDT", Discussion and Decision, 3GPP TSG-RAN WG2 #69bis, Beijing, China, Apr. 12-16, 2010, pp. 1-3, R2-102389.

Nokia Siemens Networks, Nokia Corporation, "Logged MDT principles", Discussion and Decision, 3GPP TSG-T+RAN WG2 Meeting #70, Montreal, Canada, May 10-14, 2010, 4 pgs total, R2-103191.

Catt, "Minimisation of drive tests models", Discussion and decision, 3GPP TSG-RAN WG2 Meeting #67, Shenzhen, China, Aug. 24-28, 2009, 3 pages, R2-094312.

Huawei, "RLF Analysis", 3GPP TSG-RAN WG2 Meeting #63 R2-084304, Internet <http://www.3gpp.org/ftp/tsg_ran/wg2_rl2/TSGR2_63/Docs/>, Aug. 18 to 22, 2008.

Qualcomm Europe, "RLF-based neighbour list optimization", 3GPP TSG-RAN WG3 #59 R3-080068, Internet <http://www.3gpp.org/ftp/tsg_ran/WG3_Iu/TSGR3_59/docs/>, Feb. 11 to 15, 2008.

Counterpart Japanese Office Action dated Dec. 10, 2014 in JP Application No. 2011-549008.

Communication dated Jun. 25, 2015 from the United States Patent and Trademark Office in counterpart U.S. Appl. No. 14/456,308.

Communication dated Jan. 20, 2016 from the State Intellectual Property Office issued in corresponding Application No. 201180004596.7.

NEC, T-Mobile, "UE assistance for self-optimizing of network", 3GPP TSG-RAN WG2, R2-072432, Jun. 25 to 29, 2007 (4 pages).

Communication dated Aug. 31, 2016, from the Japanese Patent Office in counterpart Japanese application No. 2015-209734.

Communication dated Feb. 8, 2017 from the Japanese Patent Office in corresponding Japanese Application 2015-209734.

Communication, dated Jun. 27, 2016, from the European Patent Office in counterpart European application No. 11731799.0.

Communication dated Jun. 10, 2015 from the Japanese Patent Office in counterpart application No. 2011-549008.

3rd Generation Partnership Project, Study on Minimization of drive-tests in Next Generation Network; (Release 9) [online] 3GPP TSG-RAN WG2#68 R2-097513, Internet <URL:http//www.3gpp.org/ftp/tsg_ran/WG2_RL2/TSGR2_68/Docs/R2-097513.zip>, Nov. 14, 2009.

Communication dated Jun. 15, 2017, issued by the Korean Intellectual Property Office in corresponding Korean Application No. 10-2017-7010988.

"3rd Generation Partnership Project; Technical Specification Group Radio Access Network; Study on Minimization of drive-tests in Next Generation, Networks (Release 9)" 3GPP TR 36.805 V2.0.0 (Dec. 2009) Technical Report (23 pages total).

Communication dated Aug. 2, 2017, issued by the State Intellectual Property Office of People's Republic of China in counterpart application No. 201410773137.0.

Extended European Search Report dated Aug. 7, 2017, issued by the European Patent Office in counterpart application No. 17151507.5.

Communication dated May 9, 2018, from the Japanese Patent Office in counterpart application No. 2017-045347.

"3rd Generation Partnership Project; Technical Specification Group Radio Access Network; Study on Minimization of drive-tests in Next Generation Networks' (Release 9)," 3GPP TR 36.805 V9.0.0 (Dec. 2009) Technical Report, pp. 1-24.

Communication dated Oct. 11, 2017 from the Korean Intellectual Property Office in counterpart application No. 10-2017-7025607.

Communication dated Feb. 9, 2018 from the United States Patent and Trademark Office in counterpart U.S. Appl. No. 15/789,297.

Notice of Allowance dated Oct. 21, 2016 in related U.S. Appl. No. 14/456,308.

RADIO COMMUNICATION SYSTEM, RADIO TERMINAL, RADIO NETWORK, RADIO COMMUNICATION METHOD AND PROGRAM

This is a divisional application based upon U.S. patent application Ser. No. 13/519,268 filed Jun. 26, 2012, which is a National Stage of International Application No. PCT/JP2011/050048 filed Jan. 5, 2011, claiming priority based on Japanese Patent Application No. 2010-002366 filed Jan. 7, 2010, the contents of all of which are incorporated herein by reference in their entirety.

TECHNICAL FIELD

The present invention relates to a radio communication system, a radio terminal, a radio network, a radio communication method, and a program therefor.

BACKGROUND ART

It is being investigated in a 3GPP (3rd Generation Partnership Project) to cause radio terminals to measure/report information conventionally collected by drive-tests or information similar hereto so as to reduce operation cost (OPEX) that is needed for the drive-tests (Drive-Test) to be performed by operators (Non-patent literature 1). The final goal of this investigation is to minimize execution of the drive-tests (Minimization of Drive-Tests: MDT. It is also called a substitute for the drive test (Drive Test Substitution)). In the feasibility study of the MDT, how the radio terminals are caused to measure the information and how the radio terminals are caused to report a log of the measurement results and the past measurement results are being discussed. Currently, the periodical reporting technique and the event triggered measurement reporting technique are specified. Additionally, what is herein called "the measurement" by the radio terminal also includes an operation of "detecting" some situations.

In the periodical technique, a radio network (for example, a radio base station) previously notifies a measurement interval and/or a report interval to the radio terminal, and the radio terminal performs the measurement and/or the reporting according hereto. Herein, as the periodic measurement, there exist the periodical quality measurements of the downlink pilot signals (Periodical downlink pilot measurements).

In the technology of the Non-patent literature 1, the radio terminal periodically performs the received quality measurement of the downlink pilot signals of serving cells (Periodical downlink pilot measurement), and periodically reports the measurement result. Herein, the so-called received quality measurement of the pilot signals is equivalent to measuring RSRP (Reference Signal Received Power), RSRQ (Reference Signal Received Quality), CPICH RSCP (Common Pilot channel Received Signal Code Power), CPICH Ec/No (Ec: received energy per chip, No: Noise power density), and the like.

The details of the Non-patent literature 1 will be explained with 3GPP LTE (Long Term Evolution) exemplified by referencing FIG. 20.

The radio terminal (UE: User Equipment) notifies a function the radio terminal itself supports to the radio base station (eNB: enhanced Node B) (UE capability report).

An upper station (EPC: Evolved Packet Core, for example, NM: Network Manager), out of the radio networks, notifies a measurement policy (Measurement policy) to the eNB (Policy indication), and the eNB gives an instruction for the measurement and the reporting to the UE according to the above policy (Measurement logging and reporting configuration). Herein, it is assumed that the measurement and the reporting are performed at an interval T1 and at an interval T2, respectively.

The UE performs the received quality measurement of the downlink pilot signals (for example, the RSRP) and the positioning at the interval T1, maintains the measurement and the measurement result as a log (Logging), and reports the above log to the eNB at the interval T2 (Measurement report). In addition, the eNB reports the report coming from the UE to the upper NW (log report).

Hereinafter, likewise, the UE repeats a series of the operations of the measurement/positioning—the logging—the reporting.

Herein, for determining a lapse of the interval T1/T2, for example, a timer is used. Further, the UE finishes the above series of the operations when the UE is instructed to do so, for example, by the eNB.

Additionally, in some cases, for not only a serving cell but also a neighboring cell, the received quality measurement of the downlink pilot signals is performed periodically.

On the other hand, in the event trigger technique, the radio network (for example, the radio base station) previously notifies the condition, being a trigger for the measurement and/or the reporting, to the radio terminal, and the radio terminal performs the measurement and/or the reporting when the above condition is satisfied. Herein, the condition, being the trigger, includes, for example, a broadcast channel reception error (Broadcast Channel Failure), a paging channel reception error (Paging Channel Failure), the received quality of the serving cell becoming worse than a predetermined threshold (Serving Cell becomes worse than threshold), extra transmit power being less than a predetermined threshold (Transmit power headroom becomes less than threshold), a failure of a random access (Random access failure), and the like (Non-patent literature 2). Additionally, the radio terminal reports information of the time as well responding to a necessity when the trigger has occurred together with the measurement result.

In addition, the radio terminal having a positioning function is instructed to perform the positioning as well periodically or a time point when the trigger has occurred, and to report location information.

In the technology of the Non-patent literature 2, the radio terminal performs the measurement (and the positioning) when the event is triggered, stores the result of the measurement (and the positioning) as the log, and reports it when the event is triggered. Herein, it is assumed that the condition under which the trigger of the measurement occurs is the paging channel reception error (Paging Channel Failure), and the radio terminal performs the received quality measurement of the downlink pilot signals of the serving cell at this time. Further, it is assumed that the condition under which the trigger of the reporting occurs is a time point when a predetermined amount of the logs have been accumulated, and the radio terminal reports the log to the radio network at this time.

The details of the technology of the Non-patent literature 2 will be explained with the 3GPP LTE exemplified by referencing FIG. 21.

The UE notifies functions the UE itself supports to the eNB (UE capability report).

The EPC (for example, NM) notifies a measurement policy (Measurement policy) to the eNB (Policy indication), and the eNB gives an instruction for the measurement and the reporting to the UE according to the above policy (Measurement logging and reporting configuration). Herein, it is assumed that the trigger of the measurement is the paging channel reception error, and the trigger of the reporting is a time point when the amount of the logs (a memory capacity of the terminal used for the logs) has reached a predetermined value.

The UE periodically receives the paging channels, performs the received quality measurement (for example, the RSRP) of the downlink pilot signals of the serving cell and the positioning thereof according to the above instruction when the paging channel reception error (Paging Channel Failure) occurs, and maintains the measurement result and the positioning result together with the time of the occurrence of the paging channel reception error as the log (Logging). And, when the amount of the logs has reached a predetermined value, the UE reports the above logs to the eNB (Measurement report). In addition, the eNB reports the report coming from the UE to the upper NW (Log report).

Hereinafter, likewise, the UE repeats a series of the operations of the measurement/positioning—the logging—the reporting.

Herein, the UE finishes the above series of the operations when the UE is instructed to do so, for example, by the eNB.

Additionally, in some cases, for not only the serving cell but also the neighboring cell, the received quality measurement of the downlink pilot signals when the trigger of the measurement occurs is performed periodically.

CITATION LIST

Non-Patent Literature

NON-PTL 1: 3GPP TR36.805v1.2.0 (internet<http://www.3gpp.org/ftp/Specs/html-info/36805.htm>)
NON-PTL 2: 3GPP R2-094291 (internet<http://www.3gpp.org/ftp/tsg_ran/WG2_RL2/TSGR2_67/Docs/R2-094191.zip>)

SUMMARY OF INVENTION

Technical Problem

In the above-described technologies, the radio terminal performs the measurement/the reporting as instructed by the radio network. However, the measurement/the reporting for the MDT is basically a support function that the radio network expects for the radio terminal, and it is also thinkable that the measurement/the reporting is an excessive operation from a viewpoint of the radio terminal. For this, the following points at issue are expected.

When the radio terminal performs the periodical measurement/reporting like the case of the Non-patent literature 1, it always performs the measurement/the reporting at an indicated timing, whereby a battery is consumed due to transmitting the information that the above radio terminal originally does not need to transmit and a load on the terminal becomes large particularly when a remaining battery charge is few. Further, it will also be a problem that there is a possibility that reported information cannot be effectively utilized in a radio network side because a reliability of location information is low when a positioning error is large, and resultantly, an unnecessary load is inflicted on the radio terminal.

Further, in a case of performing the measurement/the reporting when the event is triggered like the case of the Non-patent literature 2, for example, the radio terminal that stays in an environment in which the paging channel reception error more easily occur results in performing the measurement/the positioning and the reporting more frequently. For this, when the radio terminal of which a remaining battery charge is few, as described above, stays in such an environment, a load on the terminal becomes large. Further, the communication quality in the circumstance such that a paging channel reception error occurs is bad, and it will be a problem that a load on the terminal becomes large because a large radio resource is necessary for reporting a log.

Thereupon, the present invention has been accomplished in consideration of the above-mentioned problems, and an object thereof is to provide a radio communication system, a radio terminal, a radio network, a radio communication method, and a program therefor capable of collecting information that the radio network side requires while alleviating a load on the terminal caused by the measurement/positioning and/or the reporting, and/or deleting the reporting of the information with a low necessity.

Solution to Problem

The present invention is a radio communication system, comprising: configuration notifying means that notifies a radio terminal of configuration information related to at least one of collection of measurement information and reporting of said measurement information to a radio network by the radio terminal; status notifying means notifies said radio network of a status related to at least one of the collection and the reporting of said measurement information by said radio terminal; and reconfiguring means that receives said status, and determines whether or not to reconfigure said configuration information.

The present invention is a radio communication system, comprising: status notifying means that notifies a status related to at least one of collection and reporting of measurement information by a radio terminal; and controlling means that receives said status, and controls at least one of the collection of the measurement information and the reporting of said measurement information to a radio network by said radio terminal.

The present invention is a radio terminal, comprising: receiving means that receives configuration information related to at least one of collection of measurement information and reporting of said measurement information to a radio network; and status notifying means notifies said radio network of a status related to at least one of the collection and the reporting of said measurement information by its own terminal, wherein when the configuration information reconfigured by said radio network having received said status is transmitted from said radio network, said receiving means receives the above configuration information.

The present invention is a radio terminal in a communication system for controlling, by a radio network, at least one of collection of measurement information and reporting of said measurement information to the radio network by the radio terminal, comprising a status notifying means that notifies a status related to at least one of the collection and the reporting of said measurement information by its own terminal to said radio network.

The present invention is a radio communication method, comprising: notifying a radio terminal of configuration information related to at least one of collection of measurement information and reporting of said measurement information to a radio network by the radio terminal; notifying said radio network of a status related to at least one of the collection and the reporting of said measurement information by said radio terminal; and receiving said status and determining whether or not to reconfigure said configuration information.

The present invention is a radio communication method, comprising: notifying a status related to at least one of collection and reporting of measurement information by a radio terminal to a radio network; and receiving said status, and controlling at least one of the collection of the measurement information and the reporting of said measurement information to the radio network by said radio terminal.

The present invention is a radio network, comprising: configuration notifying means that notifies a radio terminal of configuration information related to at least one of collection of measurement information and reporting of said measurement information to a radio network by the radio terminal; and reconfiguring means that receives, from said radio terminal, a status related to at least one of the collection and the reporting of said measurement information by said radio terminal, and determines whether or not to reconfigure said configuration information.

The present invention is a program for causing an information processing device to execute the processes of: notifying a radio terminal of configuration information related to at least one of collection of measurement information and reporting of said measurement information to a radio network by the radio terminal; receiving from said radio terminal a status related to at least one of the collection and the reporting of said measurement information by said radio terminal; and receiving said status, and determining whether or not to reconfigure said configuration information.

Advantageous Effect of Invention

The present invention makes it possible to collect information that the radio network side requires while alleviating a load on the terminal caused by the measurement/positioning and/or the reporting, and/or deleting the reporting of the information with a low necessity.

DESCRIPTION OF EMBODIMENTS

Figure 1:
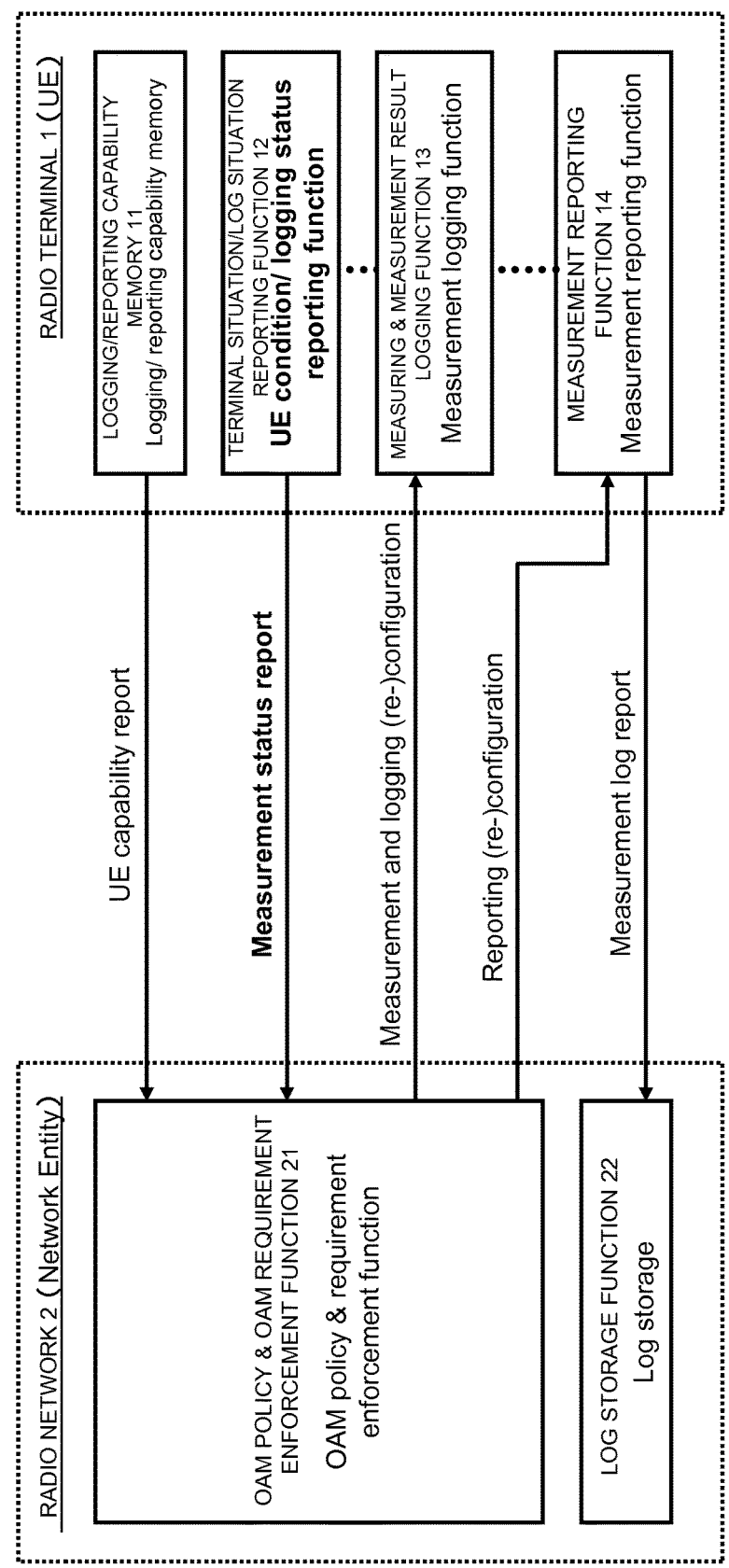
FIG. 1 is a functional constitution view of this exemplary embodiment.

The exemplary embodiments of the present invention will be explained.

Characteristics of this exemplary embodiment are that the radio terminal notifies a status of the radio terminal itself to the radio network, the radio network controls the measurement and/or the reporting of the measurement log, which corresponds to a log of measurement results, by the radio terminal, according to the above notified status.

Herein, the so-called status is a status related to at least one of the measurement and the reporting of the measurement logs, which correspond to the logs of the measurement results, by the radio terminal, and a concept including a terminal situation of the radio terminal and a collection situation of the measurement logs, and the like. Additionally, the above status is briefly described as "a measurement status" in the following. Further, as the terminal situation of the radio terminal, there exist the remaining battery charge of the radio terminal (an absolute value of the remaining battery charge, a quantized value thereof, an identification number (ID No.) previously associated with the remaining battery charge, a memory capacity of the battery, and the like), location information of the radio terminal (GPS, Cell, TA: Tracking Area, information of the outdoors/indoors, or location information acquired by other location information detecting means (for example, OTDOA: Observed Time Difference Of Arrival Technique)), a communication quality (for example, RSRP, RSRQ, CPICH RSCP, and CPICH Ec/No), a moving velocity (speed) (an absolute value of the moving velocity, a quantized value thereof, an ID No. previously associated with the moving velocity, a pre-specified level of the moving velocity, and the like), received strength of a GPS radio wave, and the like.

Further, as the collection situation of the measurement logs, there exist a sort of the measurement log (for example, a pre-specified ID No., a category, and the like), an amount of the measurement log (the number of times of the measurements, a memory usage amount of the radio terminal (UE memory usage), and the like), a summary of the measurement logs (for example, a sort of the measurement log, respective numbers of times of the measurements for the above sort of the measurement log, information of the time when the measurement has been performed, information of the location in which the measurement has been performed (GPS, Cell, TA: Tracking Area), information of the outdoors/indoors, and the like), the moving velocity, positioning performance information (a positioning error, a positioning accuracy and the like) and the like, but the collection situation is not limited hereto.

Herein, it is thinkable that the information of the outdoors/indoors can be acquired from, for example, whether the received strength of the radio wave to be used for acquiring the location information such as the GPS radio wave is equal to or more than a predetermined value, or less than it, whether the radio terminal is connected to an in-house small-size base station that is called HNB (Home NodeB) or HeNB (Home eNodeB) (detectable with PCI: Physical Cell ID), and the like. Further, with the moving velocity, the case in which the moving velocity can be actually measured with an acceleration sensor etc. mounted, and the case in which the moving velocity is estimated based on the number (or frequency) of handovers or the number (or frequency) of cell re-selections are thinkable.

Additionally, as a measurement (or detection) target for which the radio terminal stores the result as the measurement log, there exists the periodical quality measurement of the downlink pilot signals (Periodical downlink pilot measurements), the broadcast channel reception error (Broadcast Channel Failure), the paging channel reception error (Paging Channel Failure), the received quality of the serving cell becoming worse than a predetermined threshold (Serving Cell becomes worse than threshold), the extra transmit power being less than a predetermined threshold (Transmit power headroom becomes less than threshold), the failure of the random access (Random access (RA) failure), the radio link disconnection (Radio Link Failure: RLF), and the like. Further, with the case of the broadcast channel reception error (Broadcast Channel Failure), the paging channel reception error (Paging Channel Failure), the received quality of the serving cell becoming worse than a predetermined threshold (Serving Cell becomes worse than threshold), the extra transmit power being less than a predetermined threshold (Transmit power headroom becomes less than threshold), the failure of the random access (RA failure), and the radio link disconnection (RLF), it is also thinkable to acquire the communication quality (for example, the RSRP, the RSRQ, the CPICH RSCP, and the CPICH Ec/No) of the own cell (Serving cell) and/or the neighboring cells (Neighboring cell (s)) as well. In addition, for all items (or one part thereof) that the radio terminal measures (or detects), it is also thinkable to log the location information and the time information together where the above measurement (or detection) is performed. Additionally, this is only example, and the application target of the present invention is not limited hereto.

On the other hand, as the trigger of the radio terminal's performing the reporting of the measurement log, there exists an absolute time (Absolute time based), a request from the radio network (for example, the radio base station) (On demand), periodical expiration of the timer (Periodical timer based), a terminal memory usage amount (an amount of the logs) (UE memory usage based), the location of the terminal (Location based), a combination of the above-mentioned items (Combined triggers), and the like; however, the trigger is not limited hereto.

Further, the radio terminal may finish an operation of the measurement and the reporting when a measurement duration or a report duration previously notified from the radio network, or the number of times of the measurements or the number of times of the reports is satisfied, or when an instruction is received from the radio network.

Further, the so-called radio network is constituted of a core network (EPC: Evolved Packet Core or CN: Core Network), in the above radio networks, a base station controller (RNC: Radio Network Controller), and/or a radio base station (it is denoted as eNodeB, eNB, NodeB, NB, BTS, and the like). The core network includes an NM (Network Manager), and/or a DM (Device Manager), and/or an OMC (Operation and Maintenance Center) and the like; however the core network is not limited hereto.

Additionally, in the following, the measurement or the detection, an acquisition operation of information that is executed accordingly hereto, and an operation in accordance therewith are described (defined) together as "a measurement" except for the case of particularly making the explanation in details for classification. Further, the measurement information, being information that the radio terminal acquires by use of the above broadly sensed "measurement" and stores, is defined as "a measurement log". Further, what is called the collection of the measurement information signifies the acquisition of the above measurement information, namely signifies an operation of the measurement and an operation of logging (maintaining) the information acquired by the above measurement.

FIG. 1 is a functional constitution view of this exemplary embodiment.

As shown in FIG. 1, the radio communication system of this exemplary embodiment, which is a radio communication system that collects the information by causing the radio terminals to measure/report the information that the radio network requires, includes a radio terminal 1 (UE) and a radio network 2.

The radio terminal 1 (UE) has a logging/reporting capability memory 11 (Logging/reporting capability memory), a terminal situation/log situation reporting function 12 (UE condition/logging status reporting function), a measuring & measurement result logging function 13 (Measurement/logging function), and a measurement reporting function 14 (Measurement reporting function).

The radio network 2 has an OAM (Operation/Administration/Maintenance) policy & OAM requirement enforcement function 21 (OAM policy & requirement enforcement function) and a log storage function 22 (Log storage).

In the radio communication system of this exemplary embodiment, the radio terminal 1 firstly performs a terminal capability report related to a logging capability and a reporting capability (UE capability report). The terminal capability report that is performed herein is a report of notifying a function that radio terminal 1 inherently includes (for example, existence or not of the measurement function of the communication quality and the GPS function, or detailed information related hereto). And, the radio network 2 references the above terminal capability report (UE capability report), decides the measurement method or the logging method of the measurement result of the above radio terminal 1 (Measurement and logging configuration), and the reporting method (Reporting configuration), and gives an instruction to the radio terminal 1.

The radio terminal 1 performs the measurement and logs the measurement result according to the instructed measurement method and logging method. Thereafter, the radio terminal 1 performs the reporting of the log of the measurement result (measurement log) to the radio network 2 according to the instructed reporting method. (Measurement log report). Additionally, as a measurement (or detection) target that the radio terminal 1 maintains as the log, there exist the periodical quality measurement of the downlink pilot signals (Periodical downlink pilot measurements), the broadcast channel reception error (Broadcast Channel Failure), the paging channel reception error (Paging Channel Failure), the received quality of the serving cell becomes worse than a predetermined threshold (Serving Cell becomes worse than threshold), the extra transmit power being less than a predetermined threshold (Transmit power headroom becomes less than threshold), the failure of the random access (Random access failure), the radio link disconnection (Radio Link Failure: RLF), and the like.

In this exemplary embodiment, in addition, the radio terminal 1 reports the above-described measurement status (Measurement status) at a predetermined timing to the radio network 2 (Measurement status report). Additionally, now upon mentioning the timing at which the radio terminal performs the measurement status report (Measurement status report), the timing simultaneously with the terminal capability report (UE capability report) or the timing just after it, the timing at a time point when the measurement or the reporting is triggered, the timing at a time point when a predetermined event for reporting the measurement status has occurred, the timing previously indicated by the radio network, and the like are thinkable. Additionally, when reporting the measurement status at a time point when the reporting is triggered (Measurement status report), the radio terminal 1 may perform the reporting of the measurement status (Measurement status report) before performing the measurement log report (Measurement log report) in some cases, or may perform the reporting of the measurement status (Measurement status report) and the measurement log report (Measurement log report) simultaneously.

Additionally, the predetermined event for reporting the measurement status could be identical to an event for reporting the measurement log in some cases, or may be configured independently.

However, the trigger for performing the measurement status report (Measurement status report) is not limited hereto. For example, as a condition, being the trigger of the radio terminal's notifying the measurement status (Measurement status report), the absolute time (Absolute time based), the request from the radio network (On demand), the periodical expiration of the timer (Periodical timer based), a terminal memory usage amount (an amount of the logs) (UE memory usage based), the location of the terminal (Location based), a combination thereof (Combined triggers), and the like are thinkable. Additionally, at the moment that the radio network 2 notifies an instruction for configuring the measurement method or the logging method of the measurement result of the radio terminal 1 (Measurement and logging configuration) and an instruction for configuring the reporting method (Reporting configuration), and the like, these conditions under which the trigger occurs may be incorporated into these notifications in some cases, or the above conditions may be notified with the other methods in some cases. Further, the condition under which the trigger occurs may be previously configured for the radio terminal.

The radio network 2 gives an instruction for reconfiguring the measurement method and the logging method in the radio terminal 1 (Measurement and logging re-configuration), and/or an instruction for reconfiguring the reporting method of the radio terminal 1 (Reporting re-configuration) responding to a necessity based on the reported measurement status (Measurement status report) so that a load of the measurement or the reporting on the radio terminal 1 does not become excessive. That is, the measurement status is transmitted to the radio network 2 for a purpose of reconfiguring the configuration instruction (Measurement and logging configuration) of the above-described measurement method or logging method of the measurement result, the configuration instruction of the reporting method (Reporting configuration), and the like. Specifically, the measurement status is transmitted to the radio network 2 for a purpose of causing the radio network 2 to determine whether or not the reconfiguration of the configuration instruction of the measurement method or the logging method of the measurement result (Measurement and logging configuration), the configuration instruction of the reporting method (Reporting configuration), and the like is needed. In such a manner, the radio terminal 1 transmits the measurement status to the radio network 2, thereby enabling the radio network 2 to take into consideration a situation of the radio terminal and a situation related to the information collection by the radio terminal.

Additionally, it is thinkable that the above reconfiguration instruction includes any instruction of a change of at least one value of parameters notified by the above configuration instruction, an addition of new parameters not notified by the above configuration instruction, and an abort of the measurement and/or the reporting. Or, the notification of the new messages related to the instruction notified by the above configuration instruction and the like are also thinkable.

This makes it possible to collect the information that the radio network side requires while alleviating a load on the terminal caused by the measurement, the logging of the above measurement result and/or the reporting, and/or deleting the reporting of the information with a low necessity.

Additionally, the above-described message to be transmitted from the radio terminal to the radio network, and the above-described message to be transmitted from the radio network to the radio terminal can be realized with RRC (Radio Resource Control) signaling and MAC (Medium Access Control) signaling; however the signaling is not limited hereto.

Herein, examples as described below are thinkable as a relationship between the content of the measurement status and a control method of the measurement and/or the reporting, and these methods makes it possible to collect the information that the radio network side requires while alleviating a load on the terminal.

In a case of the measurement status=the remaining battery charge, the interval of the measurement/reporting is made long in the periodical measurement/reporting when the remaining battery charge is few. Or, the measurement/reporting is not allowed until the remaining battery charge reaches a predetermined threshold or more. On the other hand, an occurrence of the reporting trigger is made unlikely in the measurement/reporting by the event trigger when the remaining battery charge is few. Or, the reporting is not allowed until the remaining battery charge reaches a predetermined threshold or more. The method of aborting the measurement unless the remaining battery charge reaches a predetermined threshold or more after a lapse of a predetermined period, and causing the radio terminal to clear the measurement log, which is common to both of the periodical measurement/reporting and the measurement/reporting by the event trigger, is also thinkable.

In a case of the measurement status=the location information, the interval of the measurement/reporting is made long in the periodical measurement/reporting when the UE stays outsides an area where radio network side requires the information. The method of making an occurrence of the measurement trigger and/or the reporting trigger unlikely in the measurement/reporting by the event trigger when the UE stays outsides an area where radio network side requires the information, and the like are thinkable.

In a case of the measurement status=the communication quality, the interval of the measurement/reporting is made short in the periodical measurement/reporting when the communication quality is low. The method of facilitating an occurrence of the trigger of the measurement/reporting in the measurement/reporting by the event trigger when the communication quality is low, and the like are thinkable.

In a case of the measurement status=a moving velocity, the interval of the measurement/reporting is made long in the periodical measurement/reporting when the moving velocity is slow. The method of making an occurrence of the trigger of the measurement/reporting unlikely in the measurement/reporting by the event trigger when the moving velocity is slow and the like are thinkable.

In a case of the measurement status=the received strength of the GPS radio wave, the interval of the measurement/reporting is made long in the periodical measurement/reporting when the received strength is weak. The method of making an occurrence of the trigger of the measurement/reporting unlikely in the measurement/reporting by the event trigger when the received strength is weak, and the like are thinkable.

In a case of the measurement status=a sort of the log, the method of causing the radio terminal to report only the log of a sort that the radio network side requires at that time point (the log with a high priority), which is common to both of the periodical measurement/reporting and the measurement/reporting by the event trigger, is thinkable.

In a case of the measurement status=an amount of the logs (a memory usage amount of the terminal), the measurement interval is made long or the report interval is made short in the periodical measurement/reporting when the amount of the logs are numerous. The method of making an occurrence of the measurement trigger unlikely, or facilitating an occurrence of the reporting trigger in the measurement/reporting by the event trigger when the amount of the logs are numerous, and the like are thinkable.

In a case of the measurement status=a summary of the logs, the method of causing the radio terminal to report only the log of a sort with a high priority acquired at a specific location and a specific point in time, which is common to both of the periodical measurement/reporting and the measurement/reporting by the event trigger, is thinkable.

In a case of the measurement status=the positioning error (positioning accuracy), the interval of the measurement/reporting is made long in the periodical measurement/reporting when the error is large (the accuracy is low). The method of making an occurrence of the measurement/reporting trigger unlikely in the measurement/reporting by the event trigger when the error is large (the accuracy is low), and the like are thinkable.

In a case of the measurement status=a sort of the log and the remaining battery charge, the interval of the measurement/report of the log of a sort with a low priority is made long in the periodical measurement/reporting when the remaining battery charge is few. The method of causing the radio terminal to report only the log of a sort with a high priority in the measurement/reporting by the event trigger when the remaining battery charge is few, and the like are thinkable.

However, the above-mentioned controls are only an example, and the control that is enabled by using the present invention is not limited hereto.

Specific exemplary embodiments will be explained below.

<First Exemplary Embodiment>

Figure 2:
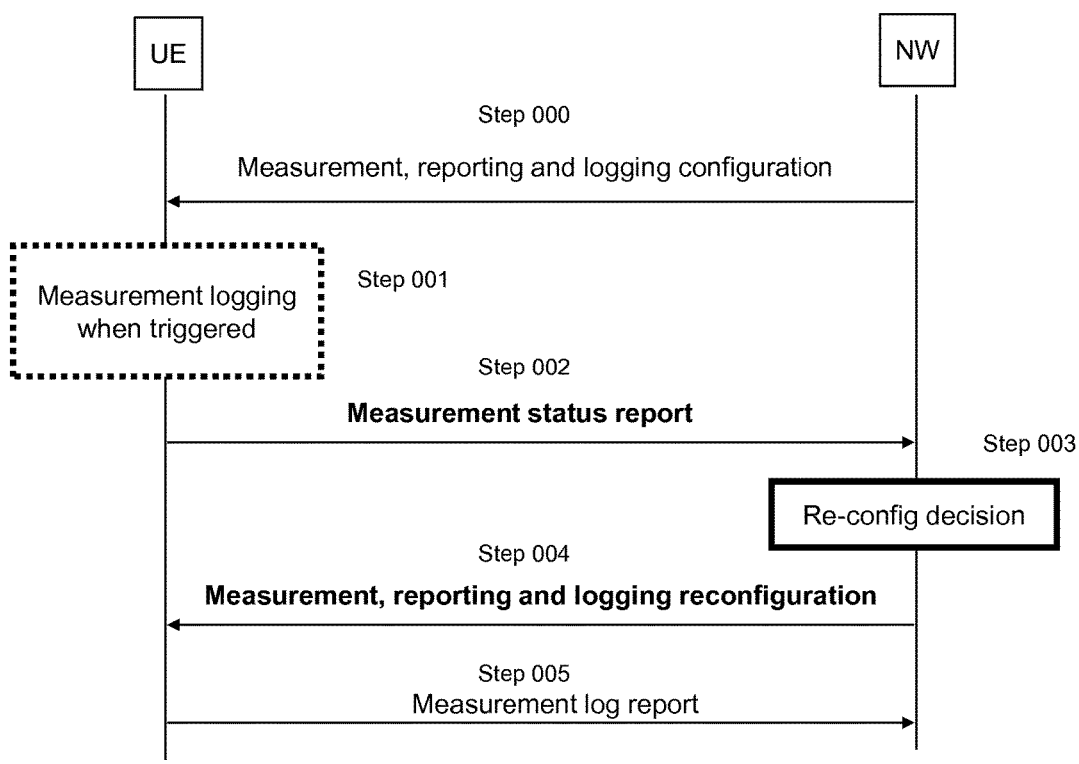
FIG. 2 is a sequence diagram for explaining a specific operation of a first exemplary embodiment.

FIG. 2 is a sequence diagram for explaining a specific operation of the first exemplary embodiment. In this exemplary embodiment, it is assumed that, basically, the radio terminal 1 executes an operation according to the configuration of the collecting method and the reporting method of the measurement information to be notified from the radio network 2.

The radio network (NW) 2 notifies the configuration information related to the collecting method of the measurement information and the reporting method of (the log of) the measurement information to the radio terminal (UE) 1 (Measurement, recording and logging configuration) (Step 000). The radio terminal (UE) 1 performs the collection of the measurement information according to the above configuration information (Measurement logging when triggered) (Step 001). The radio terminal (UE) 1 reports the measurement status to the radio network (NW) 2 with any of the periodical technique and the technique of the event trigger (Measurement status report) (Step 002). The radio network (NW) 2 determines whether the reconfiguration of the above configuration information is needed based on the above measurement status (Re-config decision) (Step 003), and notifies, to the radio terminal (UE) 1, the configuration information reconfigured for the configuration related to the collection and the reporting of the measurement information when it has determined that the reconfiguration is needed (Measurement, reporting and logging reconfiguration) (Step 004). The radio terminal (UE) 1 performs the collection and the reporting of the measurement information for the radio network (NW) 2 based on the reconfigured configuration information (Measurement log report) (Step 005).

In such a manner, the radio network (NW) takes into consideration a situation of the radio terminal (UE), a collection situation, and the like, thereby making it possible to collect desired information without inflicting an excessive load on the radio terminal (UE). Herein, the radio network (NW) can perform, for example, optimization of parameters constituting the radio network, and the like by using the collected information.

Additionally, as a node of the radio network (NW) for performing the operation in this example, for example, a base station controller (RNC), the radio base station (NB/eNB/BTS), the NM, the DM and the like are thinkable; however the node is not limited hereto.

In addition, specific exemplary embodiments will be explained below.

<Second Exemplary Embodiment>

The second exemplary embodiment will be explained. The case of supposing a system of the 3GPP LTE (Long Term Evolution) will be explained in the second exemplary embodiment.

Figure 3:
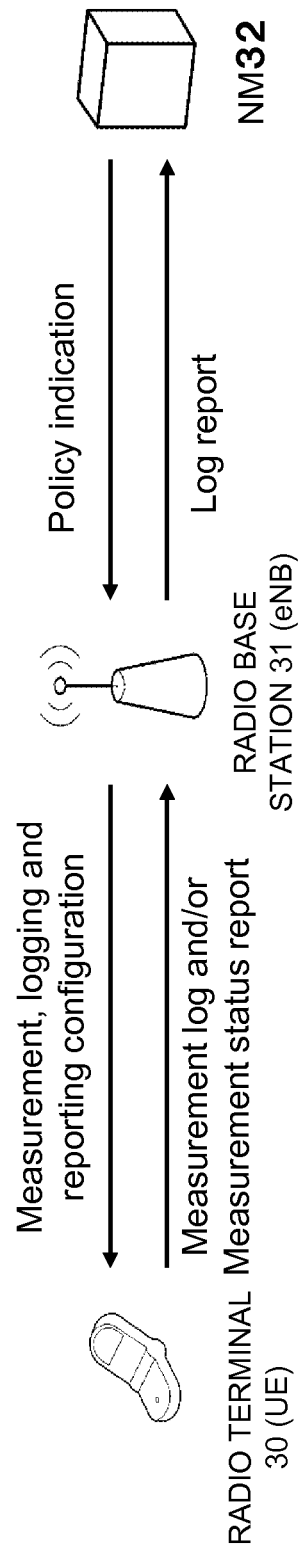
FIG. 3 is a constitution view of the radio communication system in a second exemplary embodiment.

FIG. 3 is a constitution view of the radio communication system in the second exemplary embodiment.

An NM (Network Manager) 32 notifies a policy of the measurement, the logging of the measurement result, and the reporting of the above logging by the terminal to a radio base station (eNB) 31 (Policy indication). As a target of this policy, for example, the minimization of the drive test (MDT: Minimization of Drive Test. Or it is also called a substitute for the drive test (Drive Test Substitution)) and the like are thinkable.

The radio base station (eNB) 31 notifies the configuration information including the measurement method, the logging method, and the reporting method (Measurement, logging and reporting configuration) to the radio terminal (UE) 30 based on a policy of the measurement, the logging of the measurement result, and the reporting of the above logging (Policy indication).

The radio terminal (UE) 30 reports the log of the measurement result (measurement log) and/or the measurement status to the radio base station (eNB) 31 (Measurement status report).

The radio base station (eNB) 31 reports all the measurement logs reported from the radio terminal (UE) 30, or one part of the above measurement logs to an upper NM 32 (log report).

Figure 4:
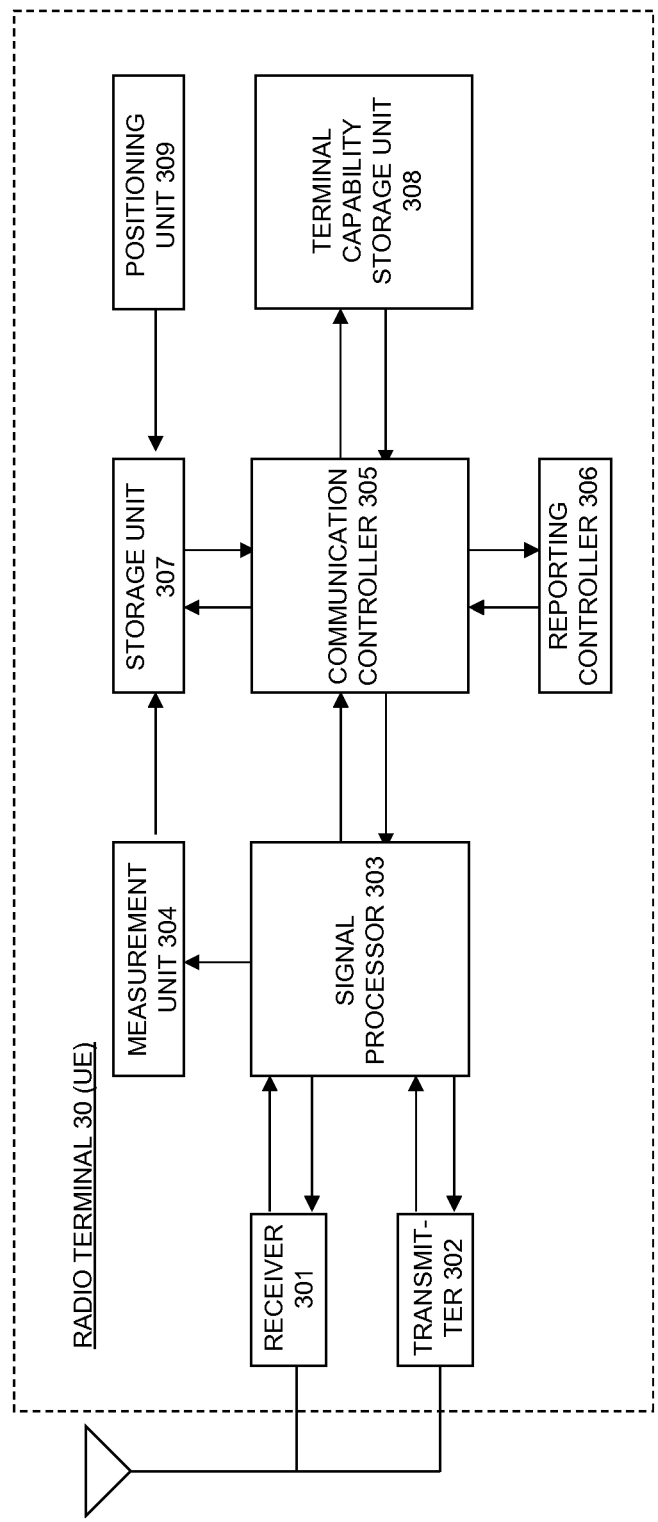
FIG. 4 is a block diagram of a radio terminal (UE) 30.

Next, a constitution of the radio terminal (UE) 30 will be explained. FIG. 4 is a block diagram of the radio terminal (UE) 30.

A transmitter 301 or a receiver 302 performs the transmission/reception of signals to/from the radio base station.

A signal processor 303 performs generation of transmission signals/demodulation of reception signals.

A communication controller 305 gives an instruction for generating the transmission signals and recovering the information to the signal processor 303.

A terminal capability storage unit 308 is a part for storing the capability etc. related to the measurement, the positioning, and the reporting of the above terminal, and the capability etc. is appropriately read out responding to a necessity.

A measurement unit 304 measures or detects the target indicated by the radio base station.

A storage unit 307 stores the information measured or detected by the measurement unit 304, and the above information is read out according to a necessity.

A positioning unit 309 performs the positioning at the moment that the measurement unit 304 has measured the target indicated by the radio base station 31. Herein, the positioning includes not only the location detection by the GPS etc. but also the reading-out of the information of the area (cell, TA and the like) in which the radio terminal stays, the acquisition of the information as to whether the terminal stays outdoors or indoors, the detection of the location information by the location information acquiring method other than it (for example, an OTDOA technique), and the like.

A reporting controller 306 gives an instruction for reporting the stored measurement information and location information to the radio base station 31 when the condition indicated by the radio base station 31 or the pre-specified condition is satisfied.

Figure 5:
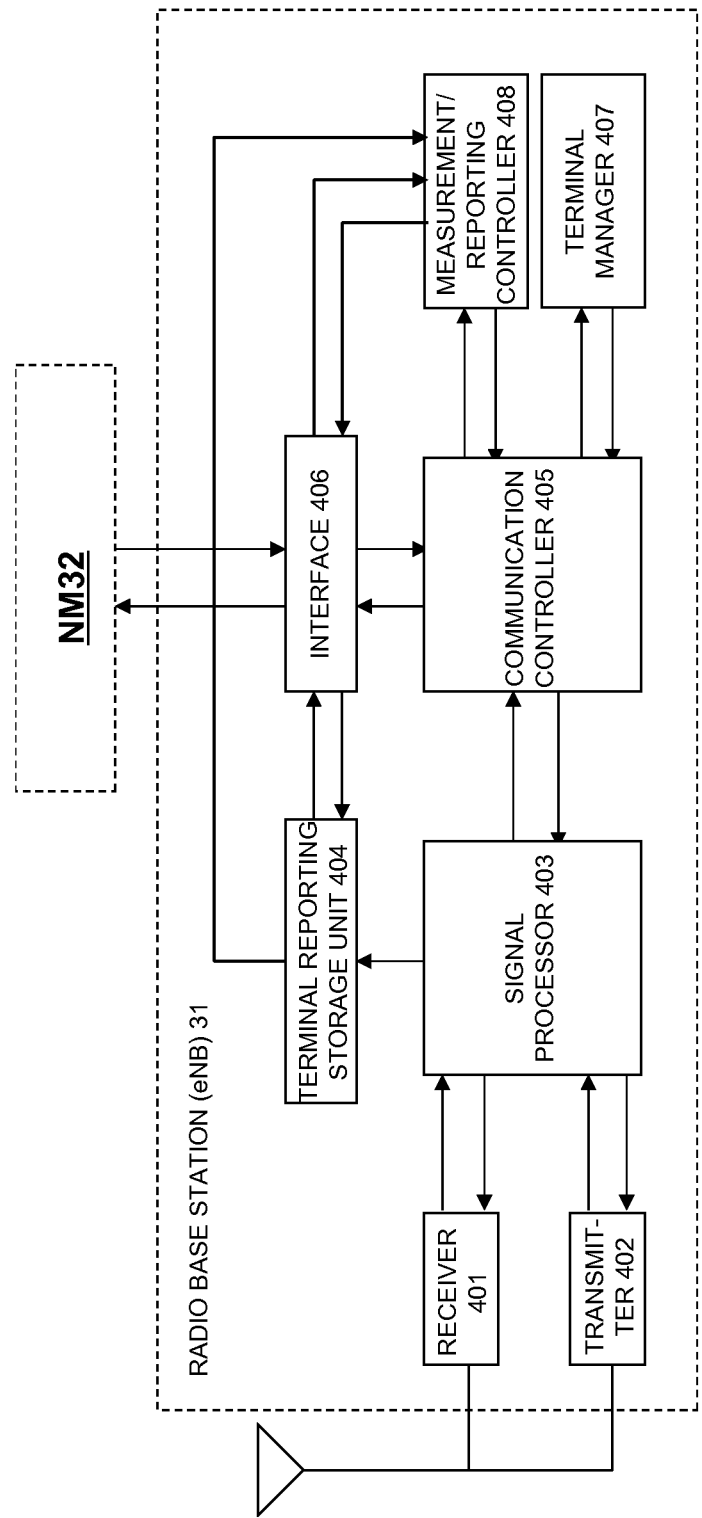
FIG. 5 is a block diagram of a radio base station (eNB) 31.

Continuously, a constitution of the radio base station (eNB) 31 will be explained. FIG. 5 is a block diagram of the radio base station (eNB) 31.

A receiver 402 or a transmitter 401 performs the transmission/reception of signals to/from the radio terminal.

A signal processor 403 performs generation of transmission signals/demodulation of reception signals.

A communication controller 405 gives an instruction for generating the transmission signals and recovering the information, and the like to the signal processor.

A terminal manager 407 separately manages respective situations of a plurality of the radio terminals.

An interface 406 performs the transmission/reception of the information to/from an upper station NM 32.

A terminal reporting storage unit 404 is a part for storing the measurement information etc. reported from the radio terminal 30, and the stored measurement information and the like are reported to the upper station NM 32 via the interface 406 responding a necessity.

A measurement/reporting controller 408 which is a part for controlling the measurement/the reporting by the radio terminal based on the policy to be indicated by the upper station NM, furthermore takes the control of the measurement/reporting in consideration of the reporting of the terminal situation and the collection situation from the radio terminal 30 in this exemplary embodiment.

Figure 6:
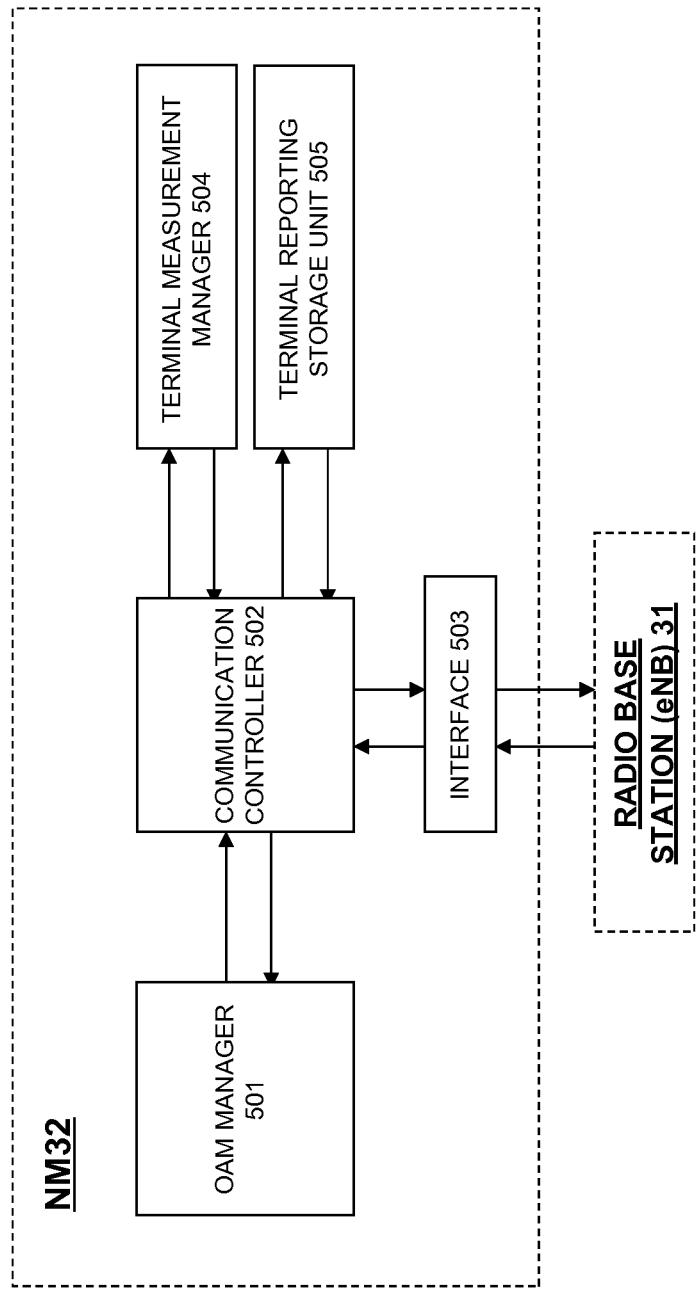
FIG. 6 is a block diagram of an NM 32.

Continuously, a constitution of the NM 32 will be explained. FIG. 6 is a block diagram of the NM 32.

An OAM manager 501 performs an operation/administration/maintenance of an entirety of the radio network.

A communication controller 502 performs a control of transmitting/receiving the information to/from other radio network nodes, for example, the radio base station, via the interface.

A terminal measurement manager 504 decides the information that needs to be collected, decides a policy for the above collection, and notifies it to the radio base station via an interface 503.

A terminal reporting storage unit 505 stores the measurement information reported from the radio terminal, and the above measurement information is read out according to a necessity. The read-out measurement information (measurement log) is used for the optimization of the radio network and the like.

Next, an operation of the radio system constituted as described above will be explained.

Figure 7:
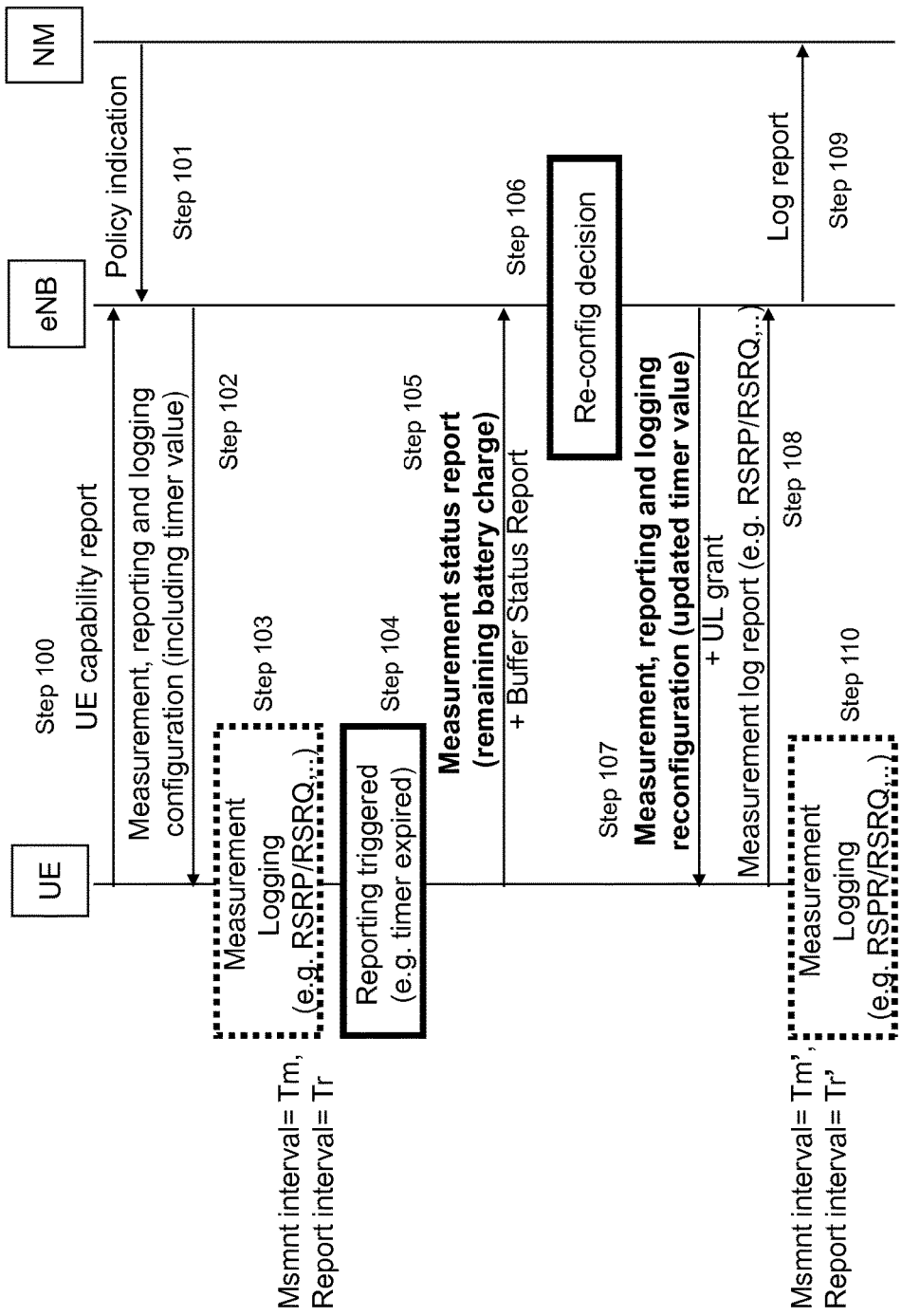
FIG. 7 is a sequence diagram for explaining a specific operation of the second exemplary embodiment.

FIG. 7 is a sequence diagram for explaining a specific operation of the second exemplary embodiment. In this exemplary embodiment, it is assumed that the measurement/the reporting by the radio terminal (UE) 30 is periodically performed based on the timer to be notified from the radio base station (eNB) 31.

Additionally, in the following explanation, it is assumed that the measurement status report (Measurement status report) is triggered at a timing in which the measurement log report is triggered, namely, at a time point when the timer for reporting the measurement log expires, and an example is explained of making the interval of the measurement and/or the report long when the remaining battery charge of the radio terminal (UE) 30 is less than a predetermined value.

At first, the radio terminal (UE) 30 performs the terminal capability report (UE capability report) (Step 100).

The NM 32 notifies the measurement policy (Measurement policy) to the radio base station (eNB) 31 (Policy indication) (Step 101).

The radio base station (eNB) 31 gives an instruction for configuring the measurement method and the reporting method (Measurement logging and reporting configuration) to the radio terminal (UE) 30 according to the above policy (Step 102). At this time, the radio base station (eNB) 31 sends a timer value (Timer value) of a measurement interval Tm (Msmnt interval Tm) at which the measurement is performed, and a timer value (Timer value) of a report interval Tr (Report interval Tr) at which the log is reported.

The radio terminal (UE) 30 performs the measurement at the measurement interval Tm (Msmnt interval Tm) based on the notified timer value and logs the measurement result according to the instructed measurement method and the reporting method (Measurement logging) (Step 103). As a timing in which the timer starts, the timing just after notification from the radio base station (eNB) 31 (Step 102), the timing after a lapse of a predetermined period since the above notification, and the like are thinkable.

The radio terminal (UE) 30 reports the remaining battery charge of its own radio terminal (Step 105) as the measurement status report (Measurement status report) when the timer of the report interval Tr (Report interval) expires (Step 104). And, the radio terminal (UE) 30 may notify a transmission buffer situation (Buffer status) together therewith.

The radio base station (eNB) 31 determines whether the remaining battery charge of the radio terminal (UE) 30 is equal to a predetermined threshold or more (Re-config decision) based on the measurement status report (Measurement status report) (Step 106).

When the remaining battery charge of the radio terminal (UE) 30 is equal to a predetermined threshold or more, the radio base station (eNB) 31 keeps the measurement interval Tm (Msmnt interval Tm) and the report interval Tr (Report interval Tr) as they are. On the other hand, when the remaining battery charge of the radio terminal (UE) 30 is less than the predetermined threshold, the radio base station (eNB) 31 decides a new measurement interval Tm' (Msmnt interval Tm'>Tm) and a new report interval Tr' (Report interval Tr'>Tr) that are intervals longer than the measurement interval Tm (Msmnt interval Tm) and the report interval Tr (Report interval Tr), respectively. And, the radio base station (eNB) 31 notifies an instruction for reconfiguring these intervals (Measurement logging and reporting reconfiguration) and a radio resource (UL grant) with which the logged measurement result is reported (Step 107).

The radio terminal (UE) 30 transmits the measurement log report to the radio base station (eNB) 31 with the received radio resource (Measurement log report) (Step 108). And, the radio base station (eNB) 31 transmits the received measurement logs to the NM 32 (Log report) (Step 109).

On the other hand, when receiving the reconfiguration notification, the radio terminal (UE) 30 reconfigures the notified new measurement interval Tm' (Msmnt interval Tm') and report interval Tr' (Report interval Tr'), and performs the measurement and the reporting at these intervals thereafter (Step 110).

This makes it possible to cause the radio terminal to perform the measurement and the reporting without (excessively) increasing a load on the radio terminal.

Additionally, while it was assumed that the trigger of the measurement status report (Measurement status report) was a timing in which the measurement log report was triggered in the above-described explanation, the above trigger is not limited hereto. For example, the timing of the measurement status report (Measurement status report) may be configured independently depending on the periodical technique, the technique of the event trigger, and the like. In addition, in a case of the event trigger, the event could be identical to an event used for reporting the measurement log in some cases, or could be different in some cases.

Further, while the measurement log report was performed after the measurement status report in the above-described explanation, the measurement log report may be partially performed simultaneously with the measurement status report.

In addition, while an example in which the measurement log report (Measurement log report) was performed periodically was explained in the above-described explanation, in a case in which the measurement log report is performed when the event is triggered, an occurrence of a trigger of the measurement log report (Measurement log report) is made unlikely if the remaining battery charge is few. Or, a control is taken in such a manner that the measurement log report (Measurement log report) is not allowed until the remaining quantity of the battery has reached a predetermined threshold or more. Further, a control can be taken in such a manner that the radio terminal is caused to abort the measurement and to clear the measurement log unless the remaining battery charge reaches a predetermined threshold or more after a lapse of a predetermined period.

Additionally, in FIG. 7, the timing at which the NM 32 notifies (Policy indication) the measurement policy (Measurement policy) to the radio base station (eNB) 31 is a timing after receiving the terminal capability report (UE capability report); however, the timing is not limited hereto, and other timings such as a timing prior to the reception of the terminal capability report (UE capability report) may be used. Further, it is enough for the radio base station (eNB) 31 to previously maintain the measurement policy (Measurement policy), and it is not indispensable that the NM 32 notifies (Policy indication) the measurement policy (Measurement policy) when the radio base station (eNB) 31 maintains the measurement policy.

Figure 8:
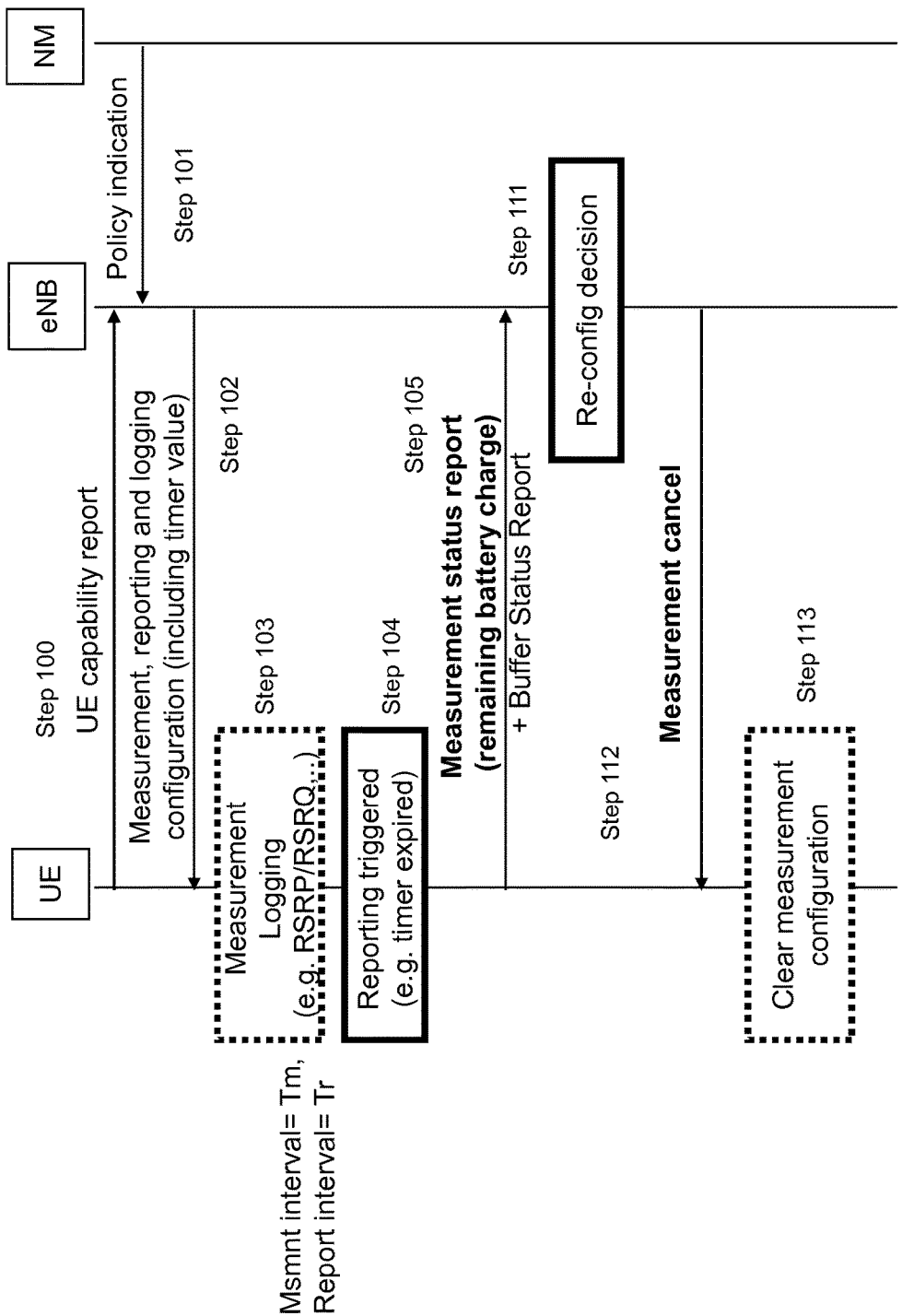
FIG. 8 is another sequence diagram for explaining a specific operation of the second exemplary embodiment.

FIG. 8 is another sequence diagram for explaining a specific operation of the second exemplary embodiment. In this exemplary embodiment, similarly to an example of FIG. 7, it is assumed that the measurement/the reporting by the radio terminal (UE) 30 is periodically performed based on the timer to be notified from the radio base station (eNB) 31. Further, it is assumed that the measurement status report (Measurement status report) is triggered at a timing in which the measurement log report is triggered, namely, at a time point when the timer for reporting the measurement log has expired.

A difference with an example of FIG. 7 lies in a point that, when the remaining battery charge of the radio terminal (UE) 30 is less than a predetermined value, the radio base station (eNB) lets the radio terminal (UE) 30 abort the measurement and the reporting.

Step 100 to 105, being the operations by the NM 32, the radio base station (eNB) 31, and radio terminal (UE) 30, respectively, are similar to those of FIG. 7. When the radio base station (eNB) 31, after receiving the measurement status report (Measurement status report), recognizes that the remaining battery charge of the above radio terminal (UE) 30 is less than a predetermined value, it decides to let the radio terminal (UE) 30 abort the measurement and the reporting (Re-config decision) (Step 111), and performs the measurement abort notification (Measurement cancel) (Step 112). When the radio terminal (UE) 30 receives the measurement abort notification, it clears the configured measurement method and reporting method, and aborts the measurement and the reporting (Clear measurement configuration) (Step 113).

Additionally, the radio base station (eNB) 31 may let the radio terminal (UE) 30 abort only the measurement, and report the measurement logs that the radio terminal (UE) 30 has already stored, and, in this case, the radio terminal (UE) 30 aborts the measurement and the reporting after reporting only the above measurement logs that the radio terminal (UE) 30 has already stored.

Additionally, while also in FIG. 8, similarly to FIG. 7, the timing at which the NM 32 notifies the measurement policy (Measurement policy) to the radio base station (eNB) 31 (Policy indication) is a timing after receiving the terminal capability report (UE capability report), the timing is not limited hereto, and other timings such as a timing prior to receiving the terminal capability report (UE capability report) may be used. Further, it is enough for the radio base station (eNB) 31 to previously maintain the measurement policy (Measurement policy), and it is not indispensable that the NM 32 notifies (Policy indication) the measurement policy (Measurement policy) when the radio base station (eNB) 31 maintains the measurement policy.

Next, an operation of the radio terminal (UE) will be explained.

Figure 9:
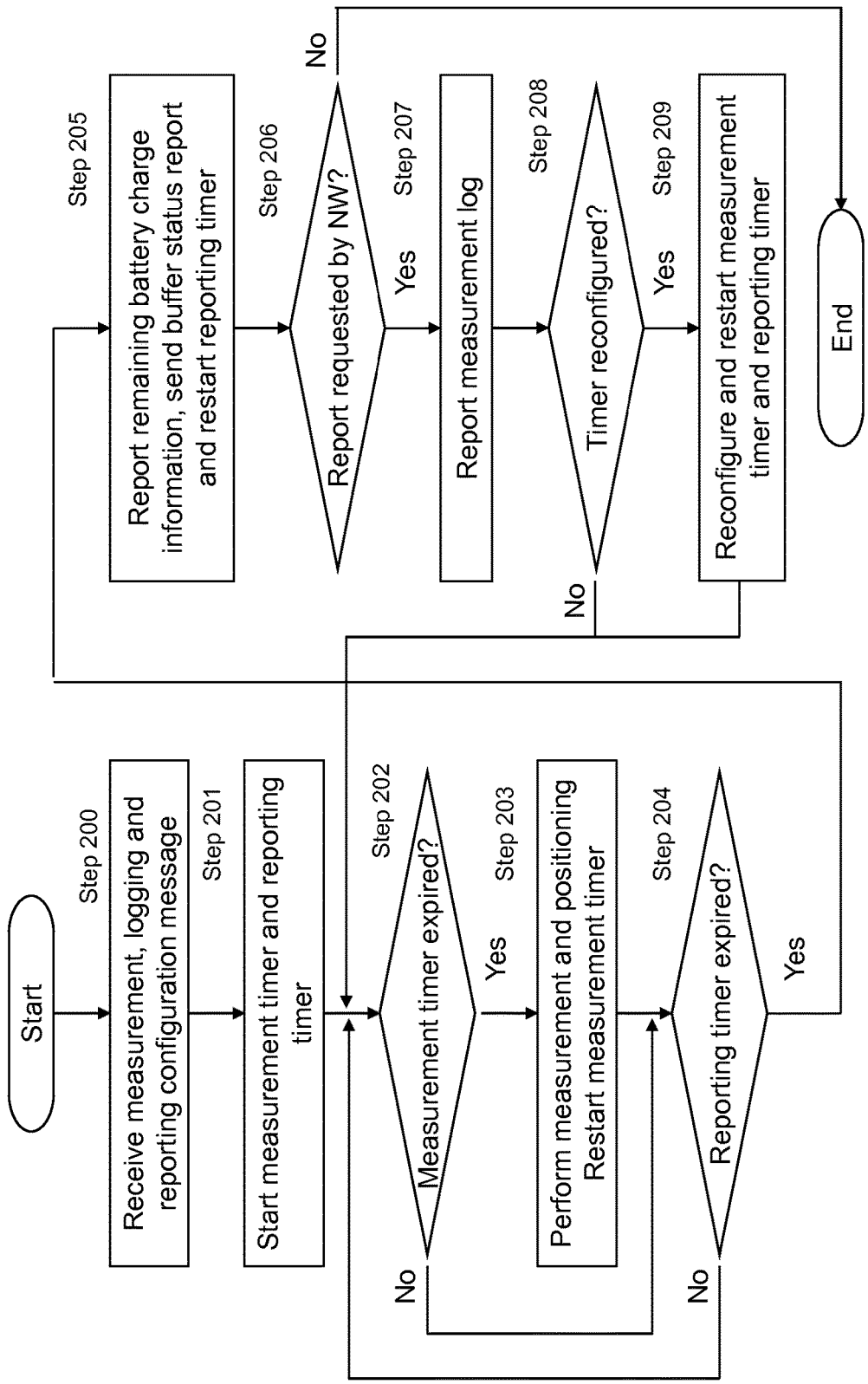
FIG. 9 is an operational flowchart of the radio terminal (UE) 30.

FIG. 9 is an operational flowchart of the radio terminal (UE) 30.

At first, the radio terminal (UE) 30 receives the configuration of the measurement method and the reporting method (Measurement logging and reporting configuration) (Step 200).

The radio terminal (UE) 30 starts the measurement timer with the timer value of the notified measurement interval Tm (Msmnt interval Tm), and starts the reporting timer with the notified report interval Tr (Report interval Tr) (Step 201).

When the measurement timer has expired (Measurement timer expired?) (Step 202), the radio terminal (UE) 30 performs the measurement and the positioning (Perform measurement and localization) and restarts the measurement timer (Restart measurement timer) (Step 203).

Continuously, when the reporting timer has expired (Reporting timer expired?) (Step 204), the radio terminal (UE) 30 reports the remaining battery charge of its own terminal (Report remaining battery charge information) as the measurement status (Measurement status report), reports the buffer situation as well (Send buffer status report), and starts the reporting timer (Restart reporting timer) (Step 205).

The radio terminal (UE) 30 performs the reporting of the log of the measurement result (measurement log) (Report measurement log) (Step 207) when the reporting of the log of the measurement result (measurement log) is requested by the radio network side (Report requested by NW?) (Step 206). When the reporting of the log of the measurement result (measurement log) is not requested (for example, receiving the abort notification, not receiving the report request even after a lapse of a certain period of time since the measurement status report, and the like), the radio terminal (UE) 30 aborts the measurement.

When the reconfiguration of the timer is requested (Step 208), the radio terminal (UE) 30 performs the reconfiguration of the measurement interval and the report interval (Reconfiguration and restart measurement timer and reporting timer) (step 209).

Figure 10:
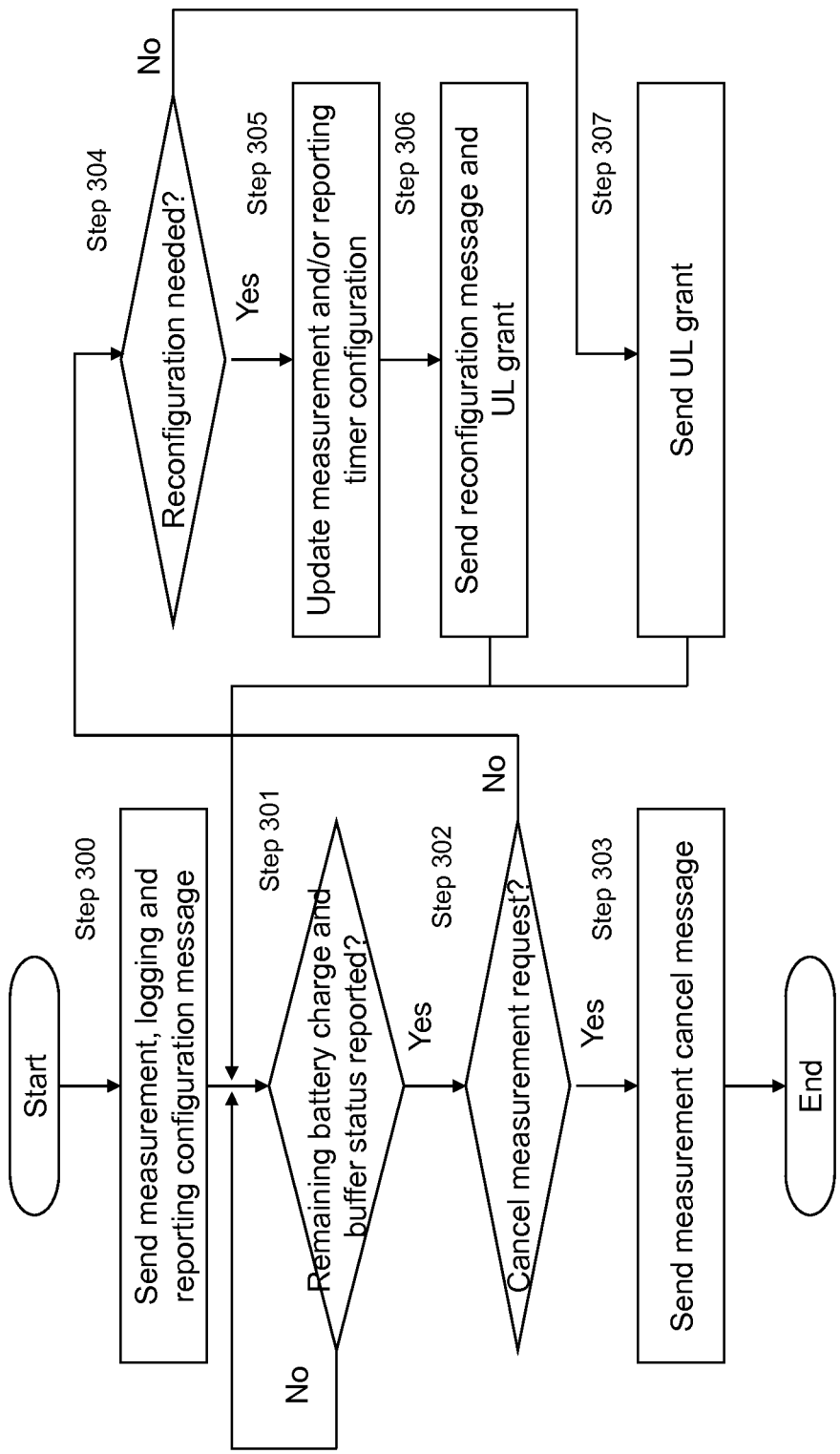
FIG. 10 is an operational flowchart of the radio base station (eNB) 31.

Next, an operation of the radio base station (eNB) 31 will be explained. FIG. 10 is an operational flowchart of the radio base station (eNB) 31.

At first, the radio base station (eNB) 31 notifies the configuration of the measurement method and the reporting method (Measurement logging and reporting configuration) (Step 300).

When the remaining battery charge and the buffer situation are reported as the measurement status (Measurement status report) from the radio terminal (UE) 30 (Remaining battery charge and buffer status reported?) (Step 301), the radio base station (eNB) 31 determines whether to abort the measurement request for the radio terminal (UE) 30 (Cancel measurement request?) (Step 302). When aborting the measurement request, the radio base station (eNB) 31 transmits a message for aborting the measurement (Send measurement cancel message) (Step 303).

On the other hand, when not letting the radio terminal (UE) 30 abort the measurement, the radio base station (eNB) 31 determines whether or not the reconfiguration of the measurement and the reporting of the radio terminal (UE) 30 is needed (Reconfiguration needed?) (Step 304). When it is not needed, the radio base station (eNB) 31 transmits information of the uplink radio resources (UL grant) for reporting the measurement log (Send UL grant) (Step 307).

On the other hand, the radio base station (eNB) 31 reconfigures the timer value of the measurement timer or the reporting timer (Update measurement and/or reporting timer configuration) when the reconfiguration of the measurement and the reporting of the radio terminal (UE) 30 is needed (Step 306). And, the radio base station (eNB) 31 transmits the timer value of the reconfigured measurement timer or the reporting timer, and the information of the uplink radio resource for reporting the measurement log to the radio terminal (UE) (Send reconfiguration message and UL grant) (Step 306).

Additionally, with regard to "Measurement cancel message" in the example of the sequence of this exemplary embodiment, both of the case of aborting only the measurement, and the case of aborting the measurement and the reporting are thinkable. Further, the case of aborting only the reporting, different from those cases, is also thinkable (for example, Log report cancel message). Further, while the case of simultaneously reconfiguring both of the measurement interval and the report interval was expected, only one of them may be reconfigured.

<Third Exemplary Embodiment>

The third exemplary embodiment will be explained. The case of supposing a system of the 3GPP LTE (Long Term Evolution) will be explained in the third exemplary embodiment. Additionally, each of the radio terminal, the radio base station, and the NM assumes a similar constitution, so explanation will be performed with concentrating on different points. In this exemplary embodiment, it is assumed that the measurement and the reporting by the radio terminal is performed with the event trigger based on the condition to be notified from the radio base station.

Figure 11:
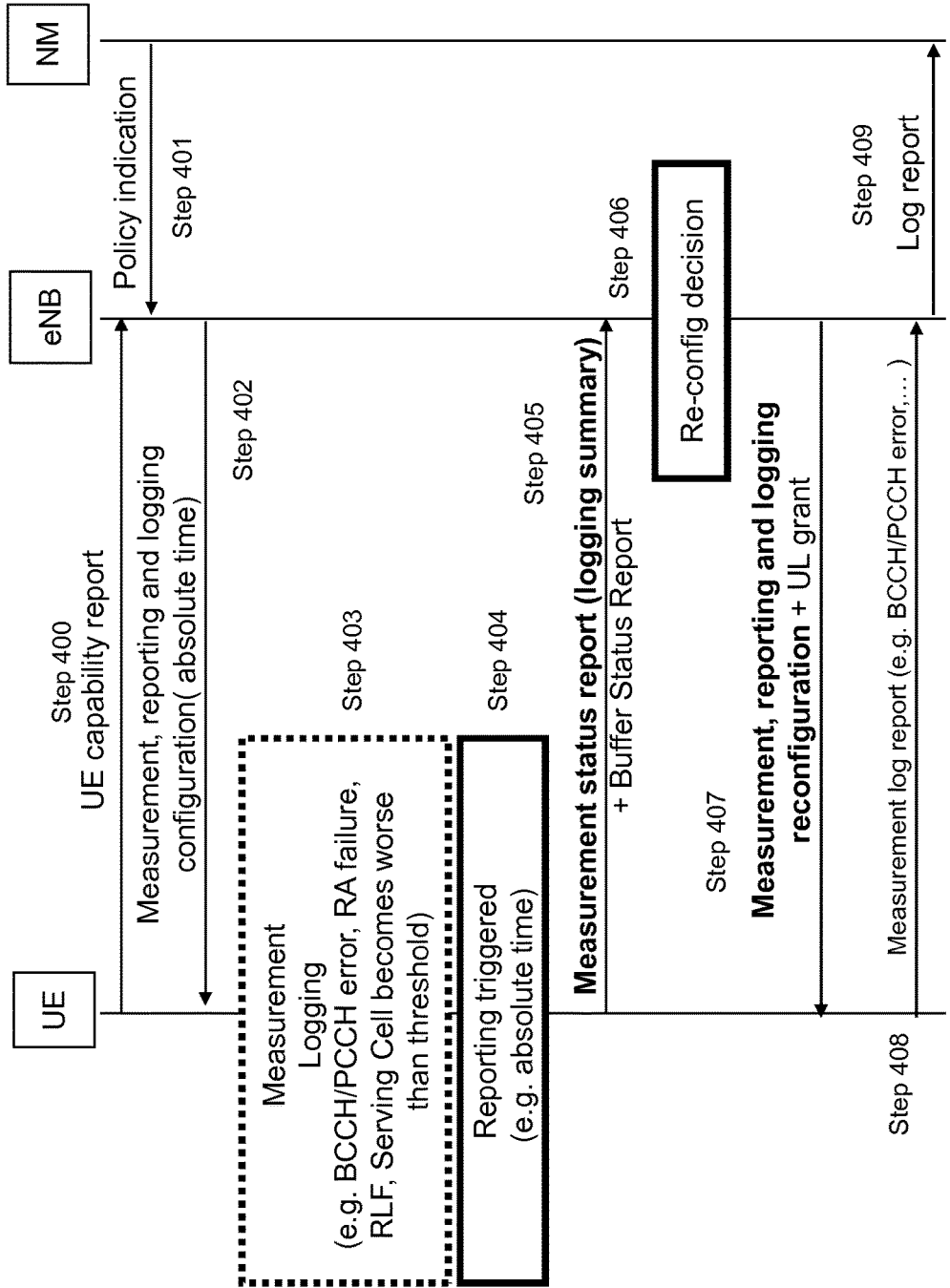
FIG. 11 is a sequence diagram for explaining an operation of a third exemplary embodiment.

FIG. 11 is a sequence diagram for explaining an operation of the third exemplary embodiment.

In the third exemplary embodiment, the case in which the measurement status (Measurement status) is a summary of the measurement logs (for example, a sort of the log, a time and a location in which the measurement has been performed (GPS, Cell, TA, information of the outdoors/indoors, and the like), will be explained. Further, the trigger of the radio terminal's reporting the measurement status (Measurement status report) is explained as an absolute time (Absolute time) to be notified from the radio base station. And, the case of limiting the logs to a specific log based on the measurement status, and making the radio terminal report it will be explained.

At first, the radio terminal (UE) 30 performs the terminal capability report (UE capability report) (Step 400).

The NM 32 notifies the measurement policy (Measurement policy) to the radio base station (eNB) 31 (policy indication) (Step 401).

The radio base station (eNB) 31 gives an instruction for the measurement and the reporting to the radio terminal (UE) 30 according the above policy (Measurement logging and reporting configuration) (Step 402). This instruction includes an instruction for measuring and logging a quality of the serving cell and/or the neighboring cell (for example, RSRP and RSRQ) and the like, and acquiring and logging the location information and/or the time simultaneously therewith in a case of, for example, a BCCH error, a PCCH error, RA failure, RLF, and the Serving Cell becoming worse than a predetermined threshold, and the time (Absolute time) when the measurement status is notified The radio terminal (UE) 30 measures pre-decided information and logs the result according to the above instruction when the measurement is triggered (Measurement logging (e.g. BCCH/PCCH error, RA failure, RLF, and Serving Cell becomes worse than threshold)) (Step 403).

The radio terminal (UE) 30 notifies a summary of the logged measurement logs, together with the transmission buffer situation when the time comes to the indicated time (Absolute time) (Measurement status report (logging summary)+Buffer status report) (Step 405). In this case, the transmission buffer situation may not need to be sent.

The radio base station (eNB) 31 determines whether to limit a measurement target and a reporting target from a summary of the collected logs (Step 406). And, when limiting (changing) the measurement target and the reporting target, the radio base station (eNB) 31 transmits an instruction for reconfiguring the measurement target and the reporting target to the radio terminal (UE) 30 (Measurement logging and reporting reconfiguration) (Step 407). Here, the radio base station (eNB) 31 may gives an instruction so that the radio terminal (UE) 30 reconfigures not both of the measurement and the reporting, but one of them.

The radio terminal (UE) 30 having received an instruction for reconfiguring the measurement and the reporting (Measurement logging and reporting reconfiguration) reports the measurement log, being a target, to the radio base station (eNB) 31 (Step 408). And, the radio base station (eNB) 31 transmits the received measurement log to the NM 32 (Log report) (Step 409).

This makes it possible to cause the radio terminal to perform the measurement and the reporting without (excessively) increasing a load on the radio terminal.

Figure 12:
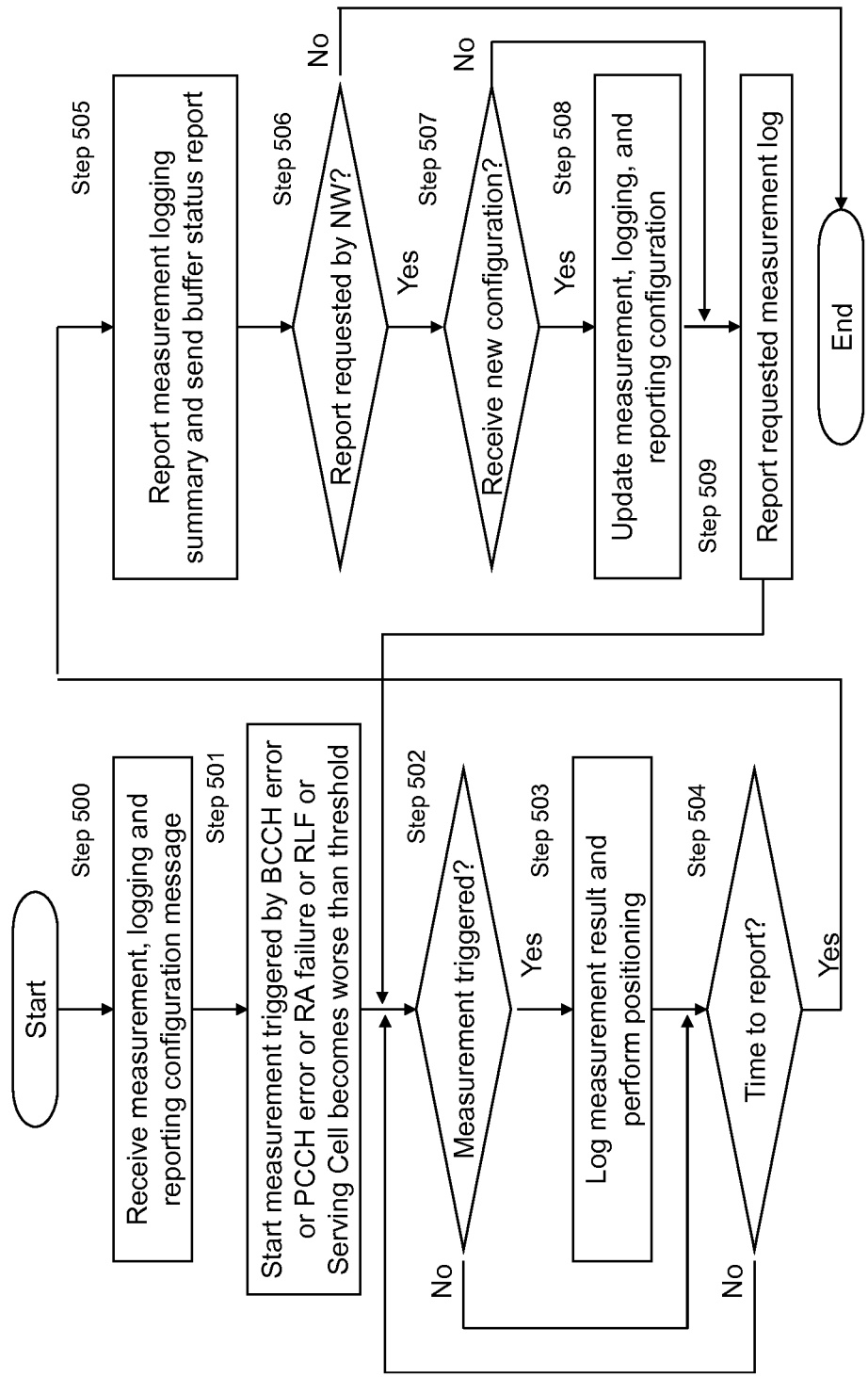
FIG. 12 is an operational flowchart of the radio terminal (UE) 30.

Next, an operation of the radio terminal (UE) 30 will be explained. FIG. 12 is an operational flowchart of the radio terminal (UE) 30.

Additionally, also in this exemplary embodiment, similarly to the second exemplary embodiment, the timing at which the NM 32 notifies the measurement policy (Measurement policy) to the radio base station (eNB) 31 (Policy indication) is a timing after receiving the terminal capability report (UE capability report); however, the timing is not limited hereto, and other timings such as a timing prior to the reception of the terminal capability report (UE capability report) may be used. Further, it is enough for the radio base station (eNB) 31 to previously maintain the measurement policy (Measurement policy), and it is not indispensable that the NM 32 notifies (Policy indication) the measurement policy (Measurement policy) when the radio base station (eNB) 31 maintains the measurement policy.

At first, the radio terminal (UE) 30 receives the configuration of the measurement method and reporting method (Measurement logging and reporting configuration) (Step 500).

When the BCCH error, the PCCH error, the RA failure, or the RLF occurs, or when the Serving Cell becomes worse than a predetermined threshold, the radio terminal (UE) 30 starts an operation of performing the indicated measurement (Start measurement triggered by BCCH error or PCCH error or RA failure or RLF or Serving Cell becomes worse than threshold (Step 501).

When even one trigger, out of these triggers, is met (Measurement triggered?) (Step 502), the radio terminal (UE) 30 performs the indicated measurement and positioning, and logs the measurement result and the location information (Log measurement result and perform localization) (Step 503).

Next, the radio terminal (UE) 30 determines whether the time comes when the indicated measurement log report is performed (Time to report?) (Step 504). When the time comes to the time for reporting, the radio terminal (UE) 30 firstly performs the reporting of a summary of the logs as the measurement status, together with the transmission buffer situation (Report measurement logging summary and send buffer status report) (Step 505). In this case, the transmission buffer information may not need to be sent.

When the measurement log report is requested by the radio network side (for example, the radio base station) after reporting the measurement status (Report requested by NW?) (Step 506), the radio terminal (UE) 30 confirms whether the reconfiguration has been requested (Receive new configuration?) (Step 507). When the reconfiguration has been requested, the radio terminal (UE) 30 reconfigures the measurement method, the logging method of the measurement result, the reporting method, and the like (Update measurement, logging, and reporting reconfiguration) (Step 508).

And, the radio terminal (UE) 30 reports the measurement log requested at the time of the reconfiguration (Report requested measurement log) (Step 509).

Figure 13:
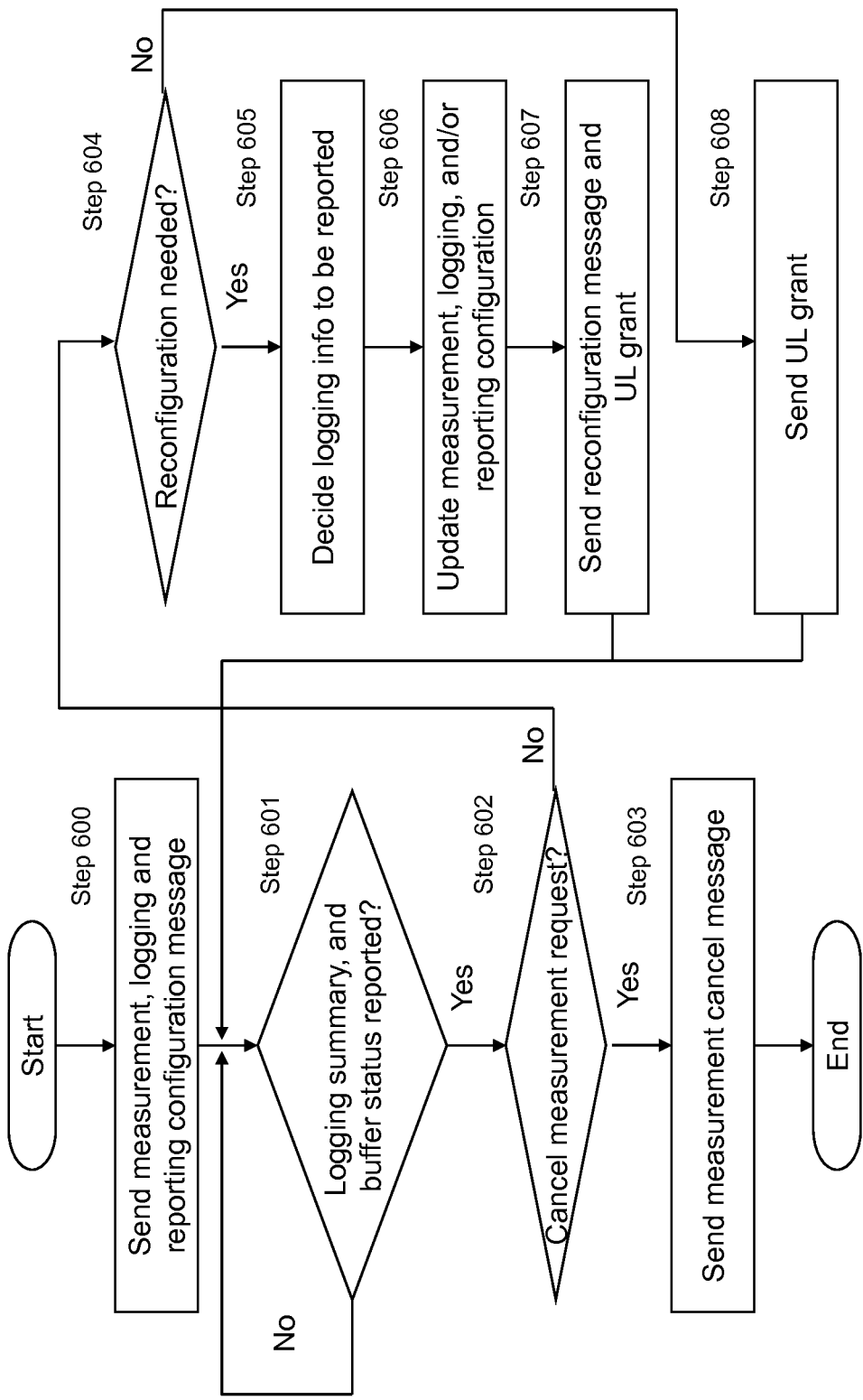
FIG. 13 is an operational flowchart of the radio base station (eNB) 31.

Next, an operation of the radio base station (eNB) 31 will be explained. FIG. 13 is an operational flowchart of the radio base station (eNB) 31.

At first, the radio base station (eNB) 31 notifies the configuration of the measurement method and the reporting method (Measurement logging and reporting configuration) (Step 600).

The radio base station (eNB) 31 determines whether a summary of the logs and the buffer situation have been reported as the measurement status (Measurement status) by the radio terminal (UE) 30 (Step 601). When they have been reported, the radio base station (eNB) 31 determines whether to abort the measurement request for the radio terminal (UE) 30 based on the above measurement status (Cancel measurement request?) (Step 602). When aborting the measurement request, the radio base station (eNB) 31 transmits a message for aborting the measurement (Send measurement cancel message) (Step 603).

On the other hand, when the radio base station (eNB) 31 does not abort the measurement request, it determines whether or not the reconfiguration of the measurement and the reporting of the radio terminal (UE) 30 is needed (Reconfiguration needed?) (Step 604). And, when the reconfiguration of the measurement and the reporting of the radio terminal (UE) 30 is needed (Steps 605, 606, and 607), the radio base station (eNB) 31 notifies an instruction for the reconfiguration and the information of the uplink radio resource for reporting the measurement log (Send reconfiguration message and UL grant) (Step 608).

<Fourth Exemplary Embodiment>

The fourth exemplary embodiment will be explained.

The case of supposing a system of the 3GPP LTE (Long Term Evolution) will be explained in the fourth exemplary embodiment. Here, each of the radio terminal, the radio base station, and the NM assumes a similar constitution, so explanation will be performed with concentrating on different points. In this exemplary embodiment, it is assumed that the measurement and the reporting by the radio terminal are performed with the event trigger based on the condition to be notified from the radio base station.

In the fourth exemplary embodiment, the case in which the measurement status (Measurement status) is a sort of the log (logging sort) and the remaining battery charge of the radio terminal is expected. Further, the explanation will be done with assuming the trigger of the radio terminal's reporting of the measurement status (Measurement status report) as a point in time when the log amount of the radio terminal (amount of logging or UE memory usage) has exceeded a predetermined threshold. And, the case of making the radio terminal report only the log of a sort with a high priority when the remaining battery charge is few, based on the measurement status will be explained.

Figure 14:
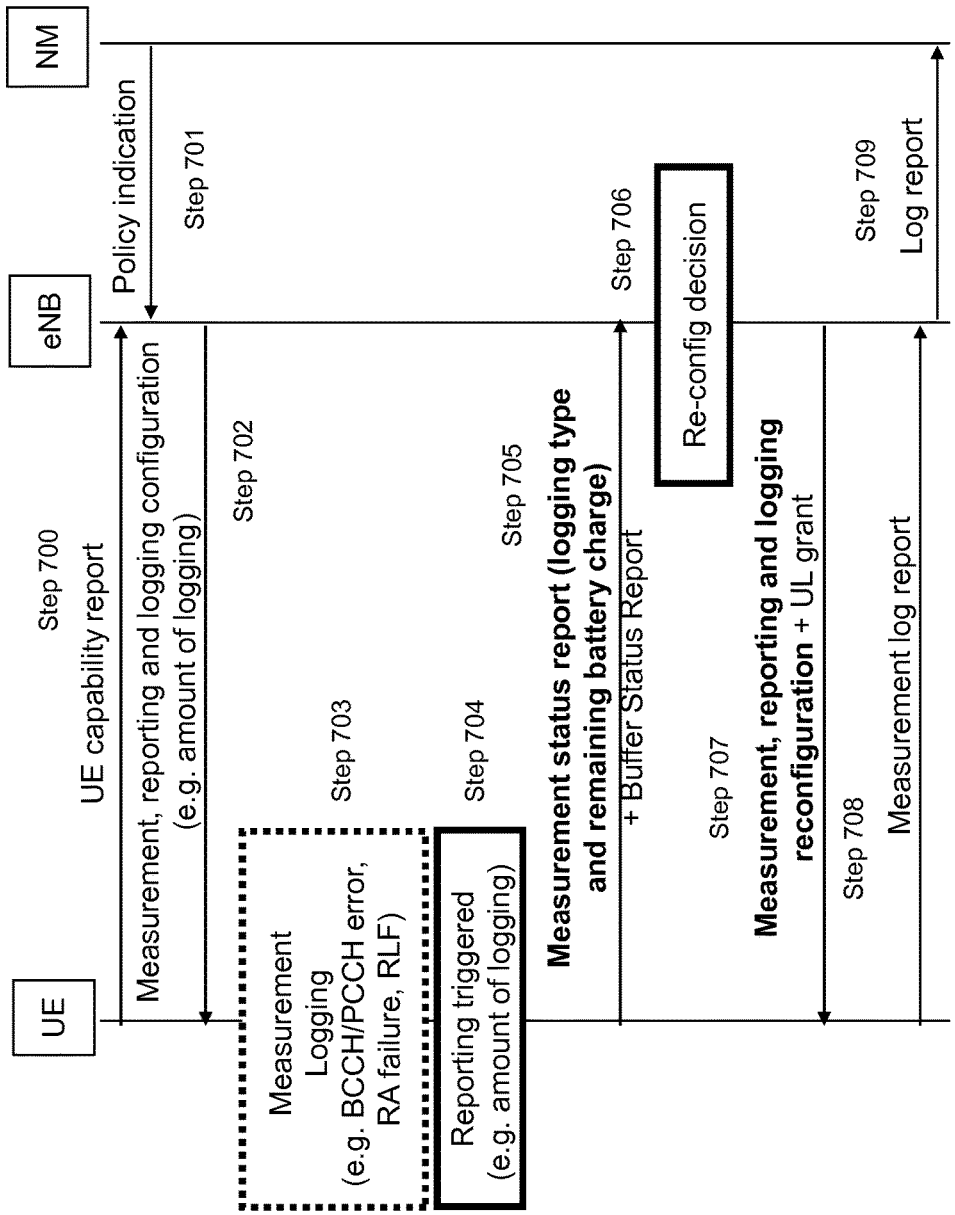
FIG. 14 is a sequence diagram for explaining an operation of a fourth exemplary embodiment.

FIG. 14 is a sequence diagram for explaining an operation of the fourth exemplary embodiment.

At first, the radio terminal (UE) 30 performs the terminal capability report (UE capability report) (Step 700).

The NM 32 notifies the measurement policy (Measurement policy) to the radio base station (eNB) 31 (Step 701).

The radio base station (eNB) 31 gives an instruction for reconfiguring the measurement and the reporting to the radio terminal (UE) 30 according to the above policy (Measurement logging and reporting configuration) (Step 702). At this time, the radio base station (eNB) 31 send a predetermined threshold as well with respect to the log amount of the radio terminal, being a trigger of the radio terminal's execution of the measurement status report (Measurement status report). Additionally, when the measurement log report is periodically performed, the radio base station (eNB) 31 send the timer value (Timer value) for the report interval (Report interval Tr) at which the measurement log is reported.

The radio terminal (UE) 30 performs the measurement and logs the measurement result according to the notified measurement and reporting (Measurement logging) (Step 703). At this time, the radio terminal (UE) 30 may perform the positioning and logs the location information, if needed.

When the log amount reaches a predetermined threshold or more (Step 704), the radio terminal (UE) 30 reports, with the above log amount taken as the trigger, the remaining battery charge of its own radio terminal as the measurement status report including a sort of the log and the remaining battery charge and the report of the transmission buffer situation (Measurement status report (logging sort and remaining battery charge) and buffer status report) (Step 705). In this case, the transmission buffer situation may not need to be notified.

The radio base station (eNB) 31 determines whether the reconfiguration of the measurement method and/or the reporting method is needed (for example, whether the remaining battery charge of the radio terminal (UE) 30 is equal to a predetermined threshold or more, and the like) (Re-config decision) based on the measurement status (Measurement status report) (Step 706). Herein, for example, when the remaining battery charge of the radio terminal (UE) 30 is equal to a predetermined threshold or more, the radio base station (eNB) 31 does not change the configuration of the measurement method and the reporting method. On the other hand, when the remaining battery charge of the radio terminal (UE) 30 is less than a predetermined threshold, the radio base station (eNB) 31 gives an instruction for the reconfiguration so as to make the radio terminal report only the log of a sort with a high priority (Measurement logging and reporting reconfiguration) (Step 707).

The radio terminal (UE) 30, which does not receive the new reconfiguration notification, transmits the measurement log to the radio base station (eNB) 31 (Measurement log report) (Step 708). On the other hand, the radio terminal (UE) 30 having received the new reconfiguration notification performs the measurement log report (Measurement log report) only for the log of a sort for which the radio terminal has been instructed to perform the reporting with a high priority (Step 708). And, the radio base station (eNB) 31 transmits all the received measurement logs or one part thereof to the NM 32 (Log report) (Step 709).

This makes it possible to cause the radio terminal to perform the measurement and the reporting without (excessively) increasing a load on the radio terminal.

Additionally, also in this exemplary embodiment, similarly to the second exemplary embodiment, the timing at which the NM 32 notifies (Policy indication) the measurement policy (Measurement policy) to the radio base station (eNB) 31 is a timing after receiving the terminal capability report (UE capability report); however, the timing is not limited hereto, and other timings such as a timing prior to the reception of the terminal capability report (UE capability report) may be used. Further, it is enough for the radio base station (eNB) 31 to previously maintain the measurement policy (Measurement policy), and it is not indispensable that the NM 32 notifies (Policy indication) the measurement policy (Measurement policy) when the radio base station (eNB) 31 maintains the measurement policy.

Next, an operation of the radio terminal (UE) will be explained.

Figure 15:
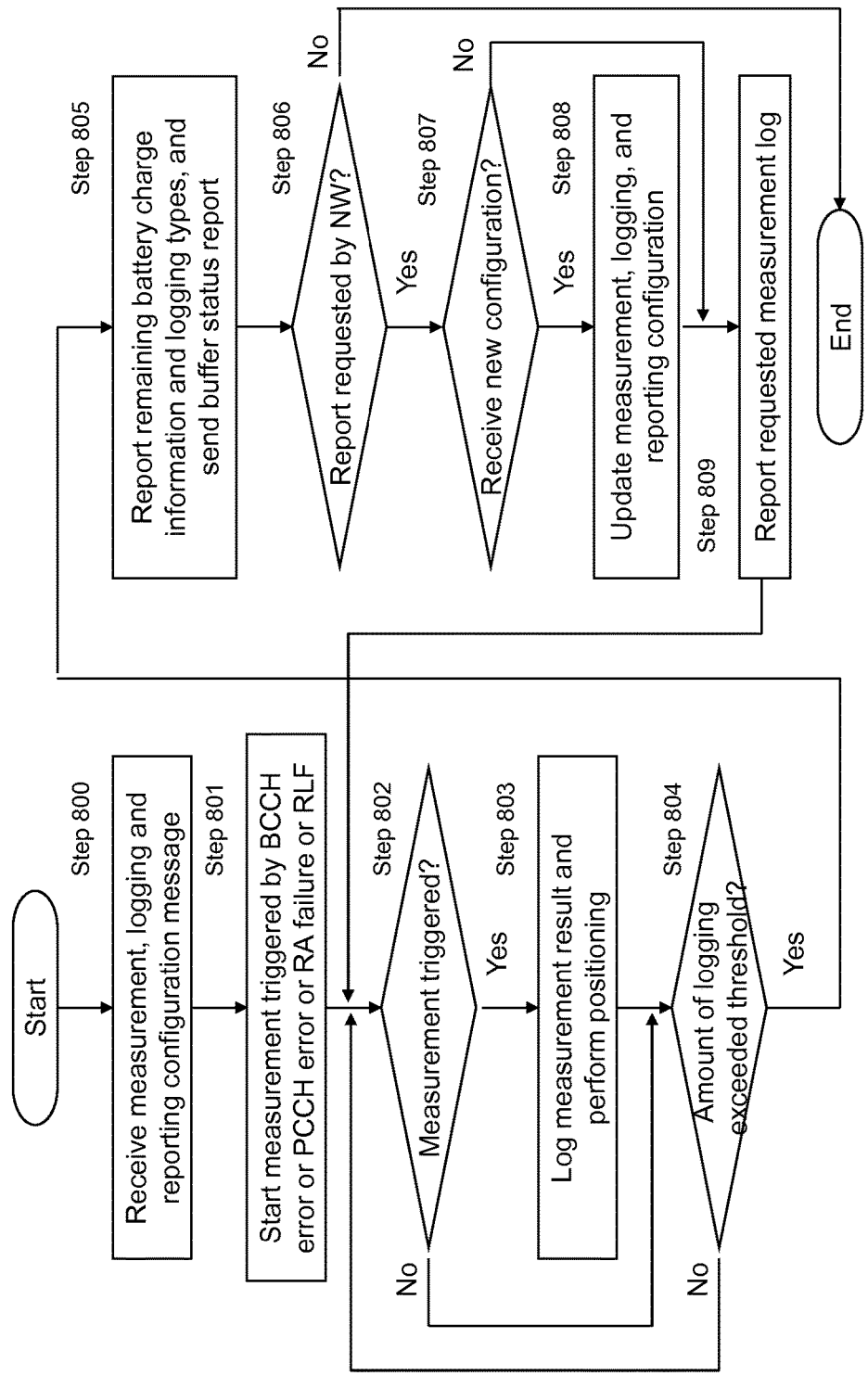
FIG. 15 is an operational flowchart of the radio terminal (UE) 30.

FIG. 15 is an operational flowchart of the radio terminal (UE) 30.

At first, the radio terminal (UE) 30 receives the configuration of the measurement method and reporting method (Measurement logging and reporting configuration) (Step 800).

When any condition of the BCCH error, the PCCH error, the RA failure, and the RLF is met (any of them is detected), the radio terminal (UE) 30 starts an operation of performing the necessary indicated measurement at the time of the above detection (Step 801). When even one of the above conditions is actually met, the radio terminal (UE) 30 performs the measurement and positioning, and logs the measurement result and the location information as the log (Log measurement result and perform localization (Steps 802 and 803).

When the amount of the logs that the radio terminal (UE) 30 stores becomes a predetermined threshold or more (Amount of logging exceeded threshold?) (Step 804), the radio terminal (UE) 30 reports the remaining battery charge of its own terminal and a sort of the log that it stores (Report remaining battery charge information and logging sort) as the measurement status (Measurement status), and reports the transmission buffer situation simultaneously therewith (Send buffer status report (Step 805).

When the measurement log report is requested by the radio network side (Report requested by NW?) (Step 806, Yes), and the radio terminal (UE) 30 does not receive a notification of the reconfiguration (Receive new configuration?) (Step 807, No), the radio terminal (UE) 30 performs the measurement log report (Report measurement log (Step 809).

On the other hand, when the measurement log report is requested by the radio network side (Report requested by NW?) (Step 806, Yes), and the radio terminal (UE) 30 receives a notification of the reconfiguration (Receive new configuration?) (Step 807, Yes), the radio terminal (UE) 30 reconfigures the measurement method, the logging method of the measurement result, and the reporting method according to the instruction (Update measurement, logging, and reporting configuration) (Step 808). And, the radio terminal (UE) 30 performs the measurement log report related to the log of a newly indicated sort (Report measurement log) (Step 809).

Figure 16:
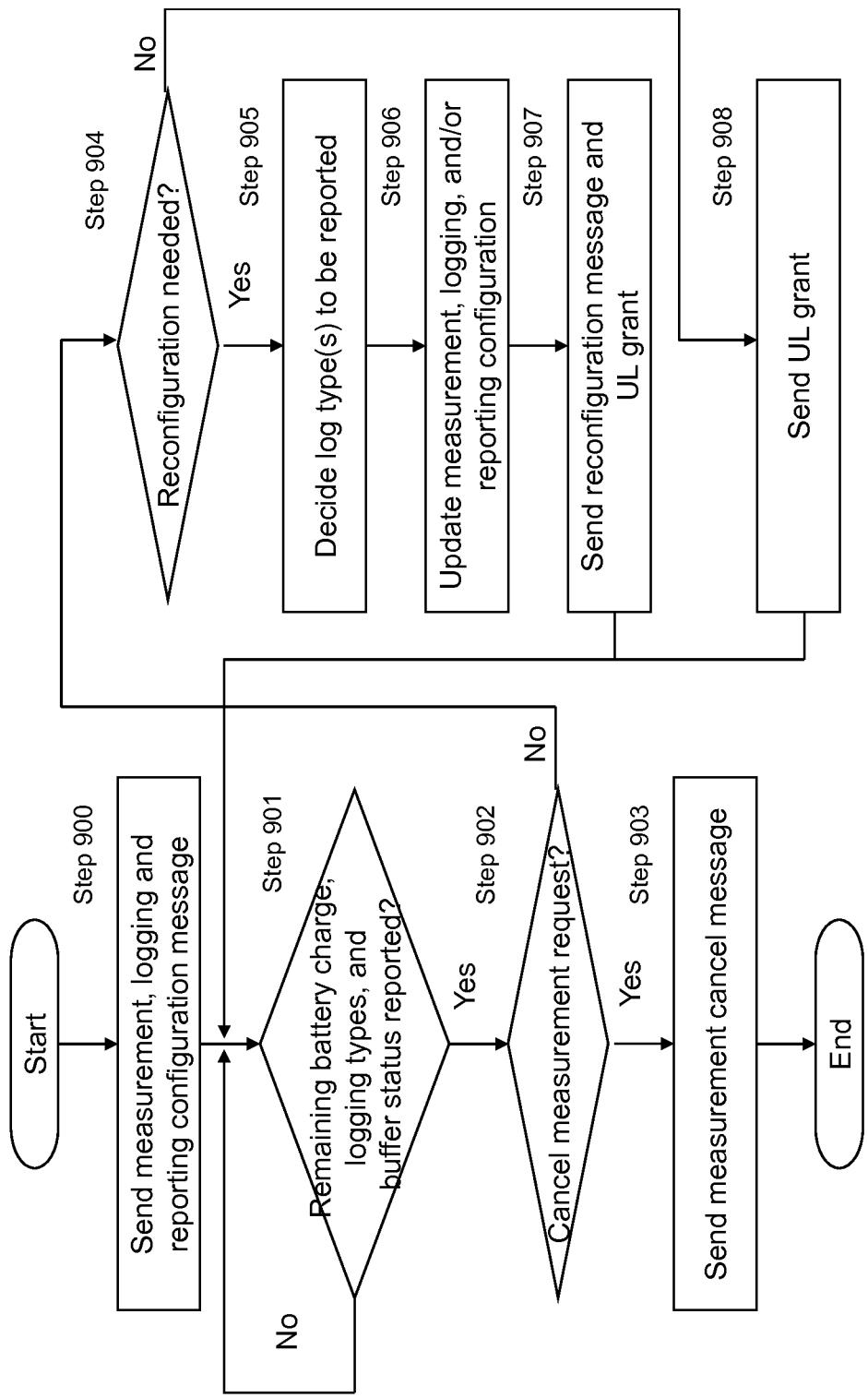
FIG. 16 is an operational flowchart of the radio base station (eNB) 31.

Next, an operation of the radio base station (eNB) 31 will be explained. FIG. 16 is an operational flowchart of the radio base station (eNB) 31.

At first, the radio base station (eNB) 31 notifies the configuration of the measurement method and the reporting method (Measurement logging and reporting configuration) (Step 900).

When the remaining battery charge and a sort of the log that the radio terminal (UE) 30 stores as the measurement status (Measurement status), and the buffer situation are reported by the radio terminal (UE) 30 (Remaining battery charge, logging sorts and buffer status reported?) (Step 901, Yes), the radio base station (eNB) 31 determines whether to abort the measurement request for the radio terminal (UE) 30 (Cancel measurement request?) (Step 902). When aborting the measurement request, the radio base station (eNB) 31 transmits a message for aborting the measurement (Send measurement cancel message) (Step 903).

On the other hand, when the radio base station (eNB) 31 does not let the radio terminal (UE) 30 abort the measurement, the radio base station (eNB) 31 determines whether or not the reconfiguration of the measurement and the reporting of the radio terminal (UE) 30 is needed (Reconfiguration needed?) (Step 904). When it is not needed, the radio base station (eNB) 31 transmits the information of the uplink radio resources for reporting the measurement log (Send UL grant) (Step 908).

On the other hand, when the reconfiguration of the measurement and the reporting of the radio terminal (UE) 30 is needed, the radio base station (eNB) 31 reconfigures a sort of the log that it causes the radio terminal (UE) 30 to report, the measurement method and/or the reporting method, and the like (Decide log sort(s) to be reported, update measurement, logging, and/or reporting configuration) (Steps 905 and 906). And, the radio base station (eNB) 31 transmits an instruction for the reconfiguration, and the uplink radio resource information for reporting the measurement log to the radio terminal (UE) (Send reconfiguration message and UL grant) (Step 907).

<Fifth Exemplary Embodiment>

The fifth exemplary embodiment will be explained.

The case of supposing a system of the 3GPP LTE (Long Term Evolution) will be explained in the fifth exemplary embodiment. Additionally, each of the radio terminal, the radio base station, and the NM assumes a similar constitution, so explanation will be performed with concentrating on different points. In this exemplary embodiment, it is assumed that the measurement and the reporting by the radio terminal are periodically performed based on the timer to be notified from the radio base station. A large difference in which the fifth exemplary embodiment differs from the above-described exemplary embodiments lies in a point that the radio terminal requests the reconfiguration of the measurement method and/or the reporting method based on the situation of the radio terminal itself.

Figure 17:
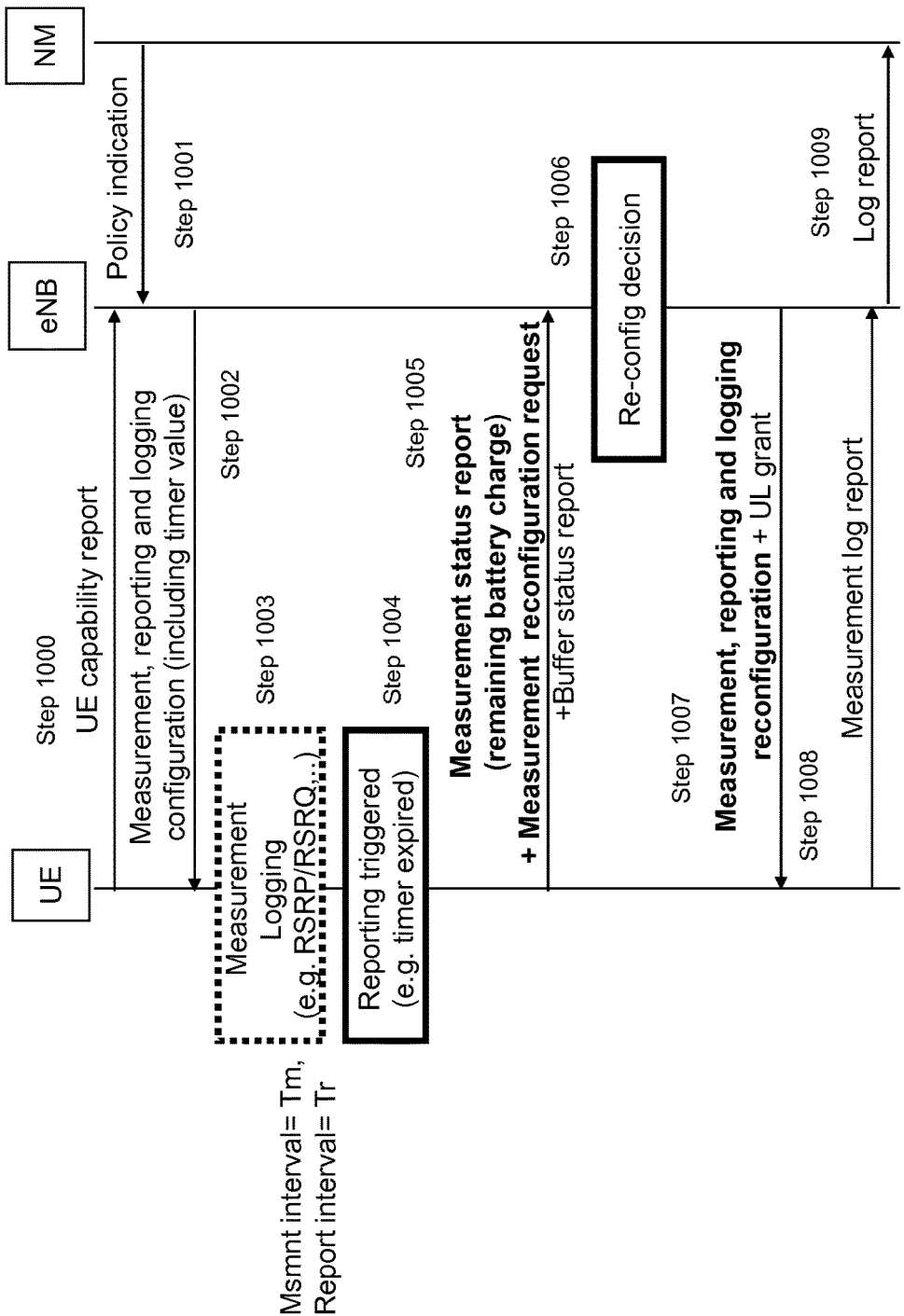
FIG. 17 is a sequence diagram for explaining a specific operation of a fifth exemplary embodiment.

FIG. 17 is a sequence diagram for explaining a specific operation of the fifth exemplary embodiment.

At first, the radio terminal (UE) 30 performs the terminal capability report (UE capability report) (Step 1000).

The NM 32 notifies the measurement policy (Measurement policy) to the radio base station (eNB) 31 (Policy indication) (Step 1001).

The radio base station (eNB) 31 gives an instruction for configuring the measurement method and the reporting method to the radio terminal (UE) 30 according to the above policy (Measurement logging and reporting configuration) (Step 1002). At this time, the radio base station (eNB) 31 sends a timer value (timer value) Tm of the interval of the measurement (Msmnt interval Tm) by the radio terminal, and a timer value (timer value) Tr of the report interval (Report interval Tr) at which the measurement log is reported.

The radio terminal (UE) 30 performs the indicated measurement and logs the measurement result at the measurement interval Tm (Msmnt interval) based on the notified timer value according to the indicated measurement method and reporting method (Measurement logging) (Step 1003). As a timing in which the timer starts, the timing just after notification from the radio base station (eNB) 31 (Step 1002), the timing after a lapse of a predetermined period since the above notification, and the like are thinkable.

When the timer of the report interval Tr (Report interval) expires (Step 1004), the radio terminal (UE) 30 performs the measurement status report such as the remaining battery charge of its own radio terminal (Measurement status report) and the transmission buffer situation report (Buffer status report) (Step 1005). At this time, when the radio terminal (UE) 30 determines that performing the requested measurement and/or reporting causes a load on the terminal itself to become large, it makes a request for reconfiguring the measurement method and/or reporting method for alleviating the above load (for example, a request for making the interval of the measurement and/or the reporting long) (Measurement reconfiguration request).

The radio base station (eNB) 31 determines whether the remaining battery charge of the radio terminal (UE) 30 is a predetermined threshold or more based on the measurement status report (Measurement status report), and in addition determines whether to actually reconfigure the measurement method and/or reporting method (Re-config decision) based on a request for the reconfiguration (Measurement reconfiguration request) (Step 1006). The radio base station (eNB) 31 does not reconfigure the measurement interval Tm (Msmnt interval Tm) and the report interval Tr (Report interval Tr) when the remaining battery charge of the radio terminal (UE) 30 is equal to a predetermined threshold or more, and decides a new measurement interval Tm' (Msmnt interval Tm'>Tm) and a new report interval Tr' (Report interval Tr'>Tr), being intervals longer than the measurement interval Tm (Msmnt interval Tm) and the report interval Tr (Report interval Tr), respectively, and reconfigures them when the remaining battery charge of the radio terminal (UE) 30 is less than the predetermined threshold. Or, the radio base station (eNB) 31 may reconfigure the measurement interval and/or the report interval so that each of them is made longer a little (for example, Tm'>Tm''>Tm, Tr'>Tr''>Tr) by taking a request for the reconfiguration by the radio terminal (UE) 30 into consideration even though the remaining battery charge is a predetermined threshold or more. And, the radio base station (eNB) 31 notifies an instruction for the reconfiguration (Measurement logging and reporting reconfiguration) and the radio resource (UL grant) with which the logged measurement result is reported (Step 1007).

The radio terminal (UE) 30 transmits the measurement log report (Measurement log report) to the radio base station (eNB) 31 with the received radio resource (Step 1008). And, the radio base station (eNB) 31 transmits the received measurement log report to the NM 32 (Log report) (Step 1009).

On the other hand, when receiving the reconfiguration notification, the radio terminal (UE) 30 reconfigures the notified new measurement interval Tm' (Msmnt interval Tm') and report interval Tr' (Report interval Tr'), and performs the measurement and the reporting at these intervals thereafter (Step 1100).

This makes it possible to cause the radio terminal to perform the measurement and the reporting without (excessively) increasing a load on the radio terminal. Herein, as the request for the reconfiguration by the radio terminal, a request for shifting the reporting timing so as to perform the reporting after a lapse of a certain period of time, a request for performing the reporting after the communication situation has improved, and the like in addition to the request for making the intervals of the measurement and/or the reporting long as shown in this exemplary embodiment are thinkable.

Additionally, while the trigger of the measurement status report (Measurement status report) was explained as a timing in which the measurement log report was triggered in the above-described explanation, the above trigger is not limited hereto. For example, the timing of the measurement status report (Measurement status report) may be configured independently depending on the periodical technique, the technique of the event trigger, and the like. In addition, in a case of the event trigger, the event could be identical to an event used for reporting the measurement log in some cases, or could be different in some cases.

Further, also in this exemplary embodiment, similarly to the second exemplary embodiment, the timing at which the NM 32 notifies the measurement policy (Measurement policy) to the radio base station (eNB) 31 (Policy indication) is a timing after receiving the terminal capability report (UE capability report); however, the timing is not limited hereto, and other timings such as a timing prior to the reception of the terminal capability report (UE capability report) may be used. Further, it is enough for the radio base station (eNB) 31 to previously maintain the measurement policy (Measurement policy), and it is not indispensable that the NM 32 notifies (Policy indication) the measurement policy (Measurement policy) when the radio base station (eNB) 31 maintains the measurement policy.

<Modified Example of the Fifth Exemplary Embodiment>

Figure 18:
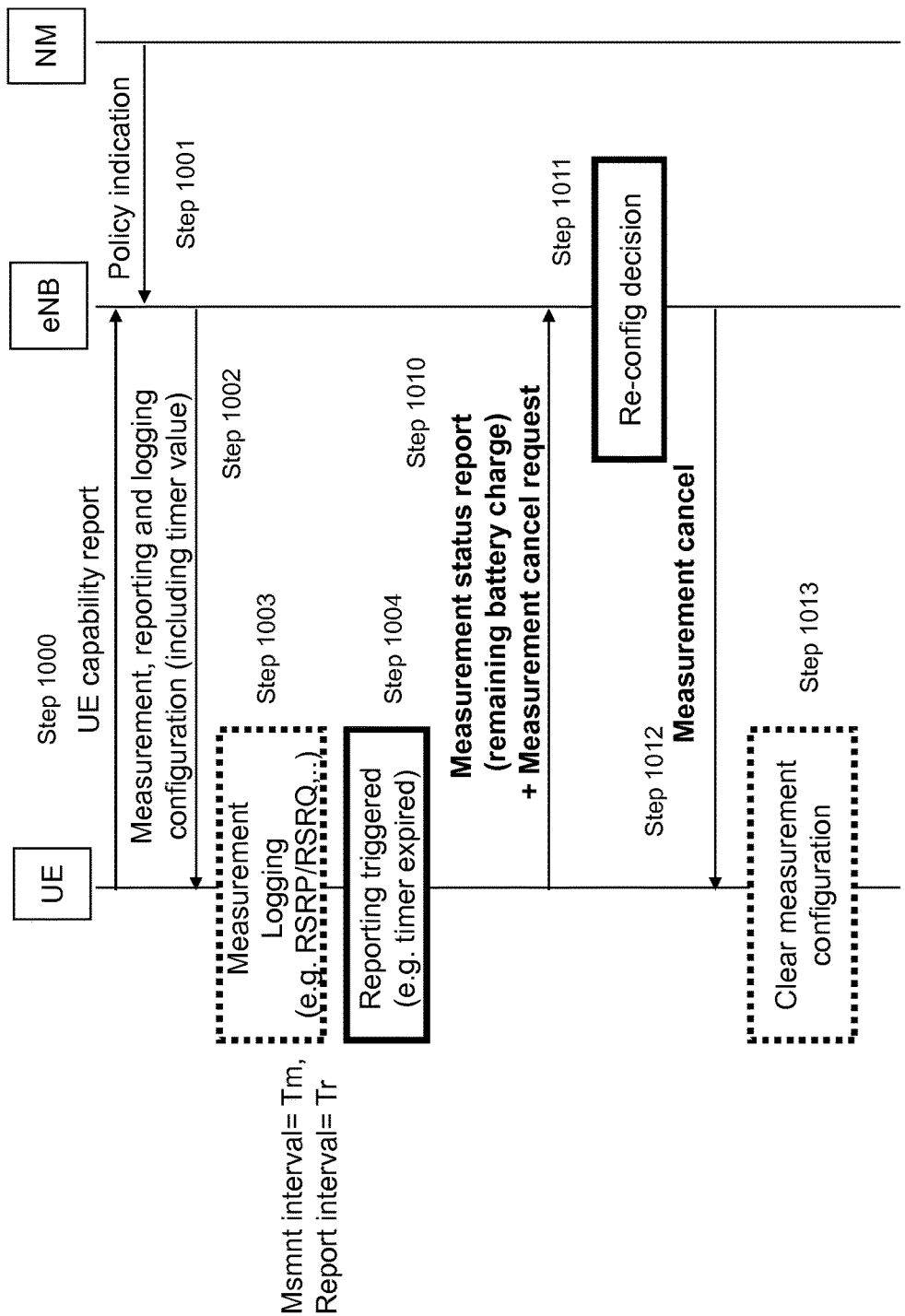
FIG. 18 is a sequence diagram for explaining a specific operation of a modified example of the fifth exemplary embodiment.

FIG. 18 is a sequence diagram for explaining a specific operation of the modified example of the fifth exemplary embodiment. A difference in which the modified example differs from the fifth exemplary embodiment lies in a point that the radio terminal requests the radio base station to abort the measurement and/or the reporting when it has judged that an load on the radio terminal itself becomes large.

In FIG. 18, steps until Steps 1000 to 1004 are similar to those of FIG. 17.

When the measurement log report is triggered (the reporting timer expires in this exemplary embodiment), the radio terminal (UE) 30 performs the measurement status report including, for example, the information such as the remaining battery charge (Measurement status report). At this time, in addition, when the radio terminal (UE) 30 determines that the configured measurement method and/or the reporting method causes a load to become large, it requests the radio base station (eNB) 31 to abort the measurement (Measurement cancel request) (Step 1010).

When the radio base station (eNB) 31 receives the above request for aborting the measurement, it determines whether to abort the measurement by the radio terminal (UE) 30 while taking the content of the received measurement status report into consideration likewise (Re-config decision) (Step 1011). When the radio base station (eNB) 31 has determined to cause the radio terminal (UE) 30 to abort the measurement, it transmits a notification for aborting the measurement to the radio terminal (UE) 30 (Measurement cancel) (Step 1012).

The radio terminal (UE) 30 clears the configuration of the measurement reports and the reporting method after receiving a notification for aborting the measurement, and aborts the measurement and the reporting (Clear measurement configuration) (Step 1013).

This makes it possible to cause the radio terminal to perform the measurement and the reporting without (excessively) increasing a load on the radio terminal.

Further, also in this exemplary embodiment, similarly to the second exemplary embodiment, the timing at which the NM 32 notifies the measurement policy (Measurement policy) to the radio base station (eNB) 31 (Policy indication) is a timing after receiving the terminal capability report (UE capability report); however, the timing is not limited hereto, and other timings such as a timing prior to the reception of the terminal capability report (UE capability report) may be used. Further, it is enough for the radio base station (eNB) 31 to previously maintain the measurement policy (Measurement policy), and it is not indispensable that the NM 32 notifies (Policy indication) the measurement policy (Measurement policy) when the radio base station (eNB) 31 maintains the measurement policy.

<Sixth Exemplary Embodiment>

Figure 19:
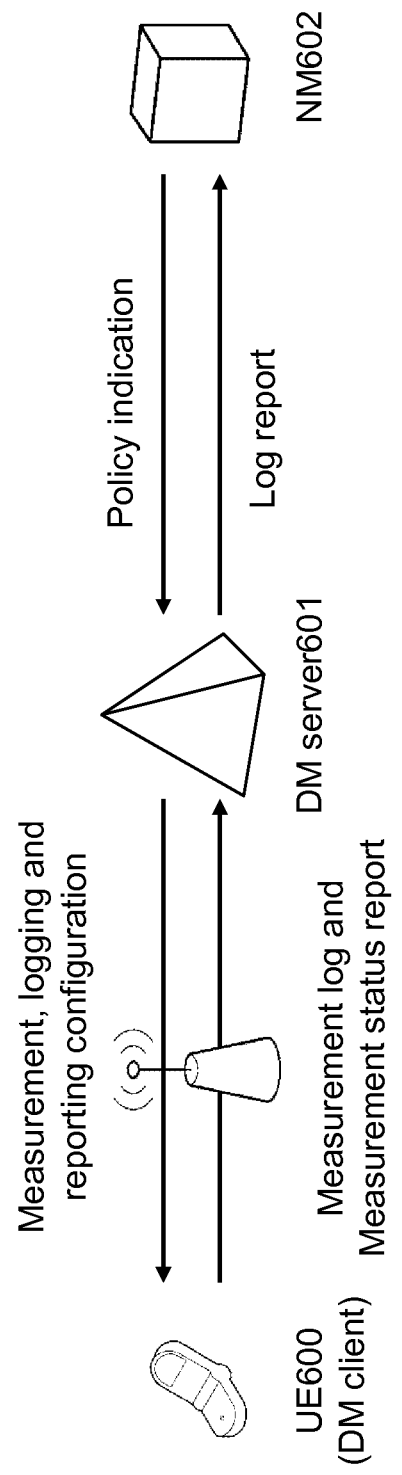
FIG. 19 is a constitution view of the radio communication system in a sixth exemplary embodiment.
Figure 20:
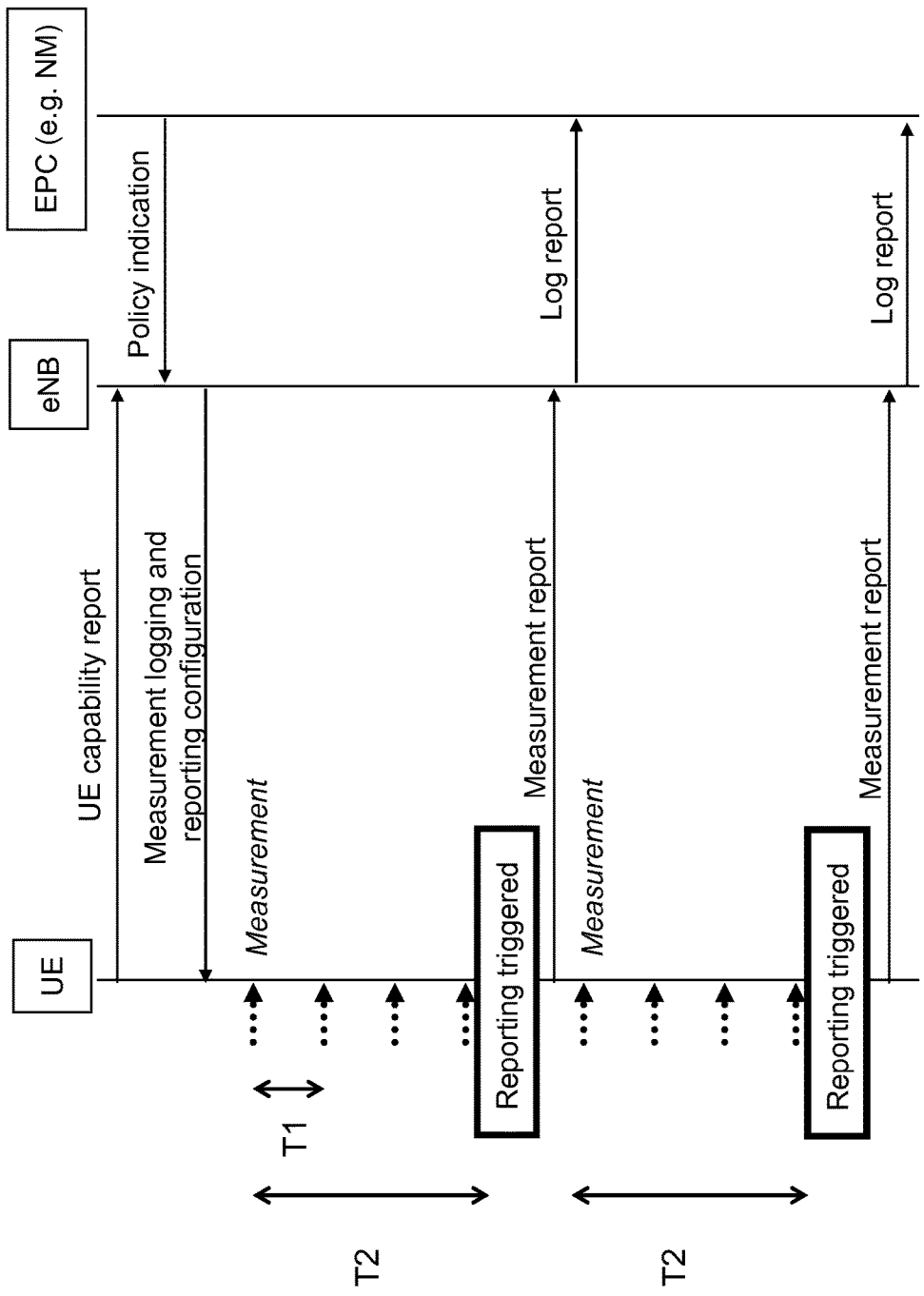
FIG. 20 is a view for explaining the technology related to the present invention.
Figure 21:
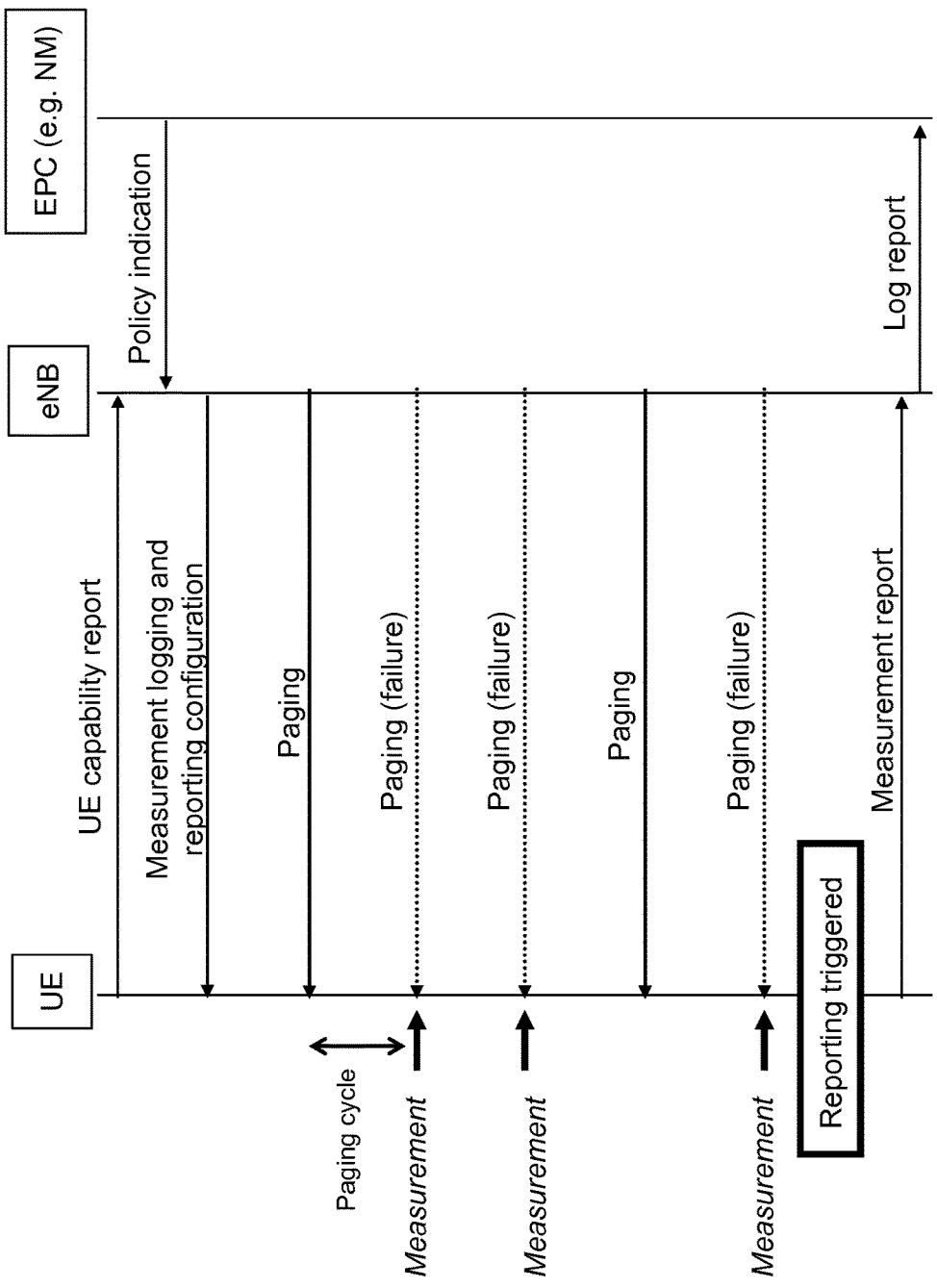
FIG. 21 is a view for explaining the technology related to the present invention.

FIG. 19 is a constitution view of the radio communication system in the sixth exemplary embodiment.

A UE (DM client) 600 corresponds to the radio terminal (UE) 30, a DM (Device Management) server 601 corresponds to the radio base station (eNB) 31, and an NM (Network Manager) 602 corresponds to the NM (Network Manager) 32. And, respective units operate similarly to the radio terminal (UE) 30, the radio base station (eNB) 31, and the NM (Network Manager) 32, respectively.

That is, the NM (Network Manager) 602 notifies a policy of the measurement, the logging of the measurement result, and the reporting of the above logging to the DM (Device Management) server 601 (Policy indication). The DM server 601 notifies the measurement/logging/reporting method to the UE 600, being a DM client (Measurement, logging and reporting configuration). The UE 600 reports the log of the measurement result/the terminal situation to the DM server 601, and the DM server 601 reports all the measurement logs reported from the UE 600 or one part thereof to the upper NM 602 (Log report).

Herein, it is a key point not to make the radio terminals perform the measurement/reporting when a load on each of the radio terminals becomes excessive in the above-described present invention. At this time, the method is also thinkable of not making all these terminals perform the measurement and/or the report when all the terminals are in an identical situation. With the regard to the reporting, it is enough to make the radio terminal perform the reporting at a time point when the terminal situation is improved (for example, the communication quality is good, and the battery is recovered to a predetermined value). However, basically, it is meaningful to perform the measurement at the indicated time point and location, whereby it is meaningless to make the radio terminal perform the measurement at a time point when the terminal situation is improved in some cases. For this, with regard to the measurement, it is also required to instruct the measurement by affixing the priority among the terminals even though the load becomes excessive. However, it is not that one part of the terminals is made perform the measurement for a long period, but that the load is dispersed among the terminals.

Additionally, in all the above-described exemplary embodiments, the policy of the measurement and the reporting was notified from the upper network node (NM) to the radio base station (eNB); however, the notification is not limited hereto. For example, the radio base station (eNB) itself may decide and configure the policy in some cases, or while taking the policy notified from the NM into consideration, the radio base station (eNB) may changes the above policy.

Further, while an example of the case in which the radio terminal actually performed the measurement and the reporting under (in a cell of) the radio base station having notified the configuration of the measurement method and the reporting method was shown in all the above-described exemplary embodiments, the application scope of the present invention is not limited hereto. For example, it is possible for the radio terminal to perform the operation as shown in the above-described exemplary embodiments so long as the above configuration is valid even after moving to cells of the other radio base stations from the cell of the radio base station having notified the configuration of the measurement method and the reporting method.

In addition, while the above-described exemplary embodiments basically supposed a system of the 3GPP LTE, the application scope of the present invention is not limited hereto. For example, the present invention is applicable to UMTS (Universal Mobile Telecommunication System) to be represented by WCDMA (Wideband Code Division Multiple Access), WiMAX (Worldwide interoperability for Microwave Access) and the like.

Further, while each unit was constituted with hardware in the above-described exemplary embodiments, it may be constituted with a program that causes an information processor (CPU) to execute the processes of the above-described operations.

Above, although the present invention has been particularly described with reference to the preferred embodiments and the examples, it should be readily apparent to those of ordinary skill in the art that the present invention is not always limited to the above-mentioned embodiment and examples, and changes and modifications in the form and details may be made without departing from the spirit and scope of the invention.

Further, the content of the above-mentioned exemplary embodiments can be expressed as follows.

(Supplementary note 1) A radio communication system, comprising:

configuration notifying means that notifies a radio terminal of configuration information related to at least one of collection of measurement information and reporting of said measurement information to a radio network by the radio terminal;

status notifying means notifies said radio network of a status related to at least one of the collection and the reporting of said measurement information by said radio terminal; and reconfiguring means that receives said status, and determines whether or not to reconfigure said configuration information.

(Supplementary note 2) A radio communication system according to Supplementary note 1, wherein said status is at least one of information related to a situation of the radio terminal and information related to a collection situation of the measurement information.

(Supplementary note 3) A radio communication system according to Supplementary note 1 or Supplementary note 2, wherein said status is transmitted for a purpose of reconfiguring said configuration information.

(Supplementary note 4) A radio communication system according to one of Supplementary note 1 to Supplementary note 3, comprising a measurement executing means that executes at least one of said collection and said reporting with the reconfigured configuration information.

(Supplementary note 5) A radio communication system according to one of Supplementary note 2 to Supplementary note 4, wherein said information related to the situation of the radio terminal is at least one of a remaining battery charge of the radio terminal, location information of the radio terminal, received strength of a positioning radio wave (GPS radio wave) at the radio terminal, a communication quality of the radio terminal, and a moving velocity of the radio terminal, or a combination thereof.

(Supplementary note 6) A radio communication system according to one of Supplementary note 2 to Supplementary note 5, wherein said information related to the collection situation of the measurement information is at least one of a sort of the measurement information collected by the radio terminal, an amount of the measurement information collected by the radio terminal, a summary of the measurement information collected by the radio terminal, and positioning performance information of the radio terminal, or a combination thereof.

(Supplementary note 7) A radio communication system according to Supplementary note 6, wherein said summary of the measurement information is at least one of said sort of the measurement information, for each sort of said measurement information, a number of the measurement, a measurement time, and location information of the radio terminal at a point in time when the measurement has been performed, or a combination thereof.

(Supplementary note 8) A radio communication system according to one of Supplementary note 1 to Supplementary note 7, wherein said reconfiguring means reconfigures at least one of an interval of the collection of said measurement information and/or the reporting of said measurement information, a trigger of the collection of said measurement information and/or the reporting of said measurement information, a sort of said measurement information to be collected and/or a sort of said measurement information to be reported, and a collection amount of said measurement information and/or an amount of said measurement information to be reported, or a combination thereof.

(Supplementary note 9) A radio communication system according to one of Supplementary note 1 to Supplementary note 8, wherein said status notifying means notifies said status at anyone of a periodical timing of the collection and/or the reporting of said measurement information, a timing of the collection and/or the reporting of said measurement information by a predetermined trigger, a timing pre-configured by said radio network, and a timing in which a predetermined event for notifying said status has occurred.

(Supplementary note 10) A radio communication system according to one of Supplementary note 1 to Supplementary note 9, wherein said status notifying means indicates a measurement method and/or a reporting method of said measurement information, or instructs an abort of the measurement and/or the reporting when notifying said status.

(Supplementary note 11) A radio communication system according to one of Supplementary note 1 to Supplementary note 10, wherein said radio network includes at least one of a radio base station, a base station controller, a DM (Device Manager), and an NM (Network Manager).

(Supplementary note 12) A radio communication method according to one of Supplementary note 1 to Supplementary note 11, comprising transmitting said status for a purpose of determining whether or not the reconfiguration of the configuration information.

(Supplementary note 13) A radio communication method according to one of Supplementary note 1 to Supplementary note 12, comprising transmitting said status for a purpose of considering a situation of the radio terminal.

(Supplementary note 14) A radio communication method according to one of Supplementary note 1 to Supplementary note 13, comprising transmitting said status for a purpose of considering a situation related to the information collection by the radio terminal.

(Supplementary note 15) A radio communication system, comprising:

status notifying means that notifies a status related to at least one of collection and reporting of measurement information by a radio terminal; and controlling means that receives said status, and controls at least one of the collection of the measurement information and the reporting of said measurement information to a radio network by said radio terminal.

(Supplementary note 16) A radio terminal, comprising:

receiving means that receives configuration information related to at least one of collection of measurement information and reporting of said measurement information to a radio network; and status notifying means notifies said radio network of a status related to at least one of the collection and the reporting of said measurement information by its own terminal, wherein when the configuration information reconfigured by said radio network having received said status is transmitted from said radio network, said receiving means receives the above configuration information.

(Supplementary note 17) A radio terminal according to Supplementary note 16, wherein said status is at least one of information related to a situation of the radio terminal and information related to a collection situation of the measurement information.

(Supplementary note 18) A radio terminal according to Supplementary note 16 or Supplementary note 17, wherein said status is transmitted for a purpose of reconfiguring said configuration information.

(Supplementary note 19) A radio terminal according to one of Supplementary note 16 to Supplementary note 18, comprising a measurement executing means that executes at least one of said collection and said reporting with the reconfigured configuration information.

(Supplementary note 20) A radio terminal according to one of Supplementary note 17 to Supplementary note 19, wherein said information related to the situation of the radio terminal is at least one of a remaining battery charge of the radio terminal, location information of the radio terminal, received strength of a positioning radio wave (GPS radio wave) at the radio terminal, a communication quality of the radio terminal, and a moving velocity of the radio terminal, or a combination thereof.

(Supplementary note 21) A radio terminal according to one of Supplementary note 17 to Supplementary note 20, wherein said information related to the collection situation of the measurement information is at least one of a sort of the measurement information collected by the radio terminal, an amount of the measurement information collected by the radio terminal, a summary of the measurement information collected by the radio terminal, and positioning performance information of the radio terminal, or a combination thereof.

(Supplementary note 22) A radio terminal according to Supplementary note 21, wherein said summary of the measurement information is at least one of said sort of the measurement information, for each sort of said measurement information, a number of the measurement, a measurement time, and location information of the radio terminal at a point in time when the measurement has been performed, or a combination thereof.

(Supplementary note 23) A radio terminal according to one of Supplementary note 16 to Supplementary note 22, wherein said receiving means receives said reconfiguration information having at least one of an interval of the collection of said measurement information and/or the reporting of said measurement information, a trigger of the collection of said measurement information and/or the reporting of said measurement information, a sort of said measurement information to be collected and/or a sort of said measurement information to be reported, and a collection amount of said measurement information and/or an amount of said measurement information to be reported, or a combination thereof reconfigured therein.

(Supplementary note 24) A radio terminal according to one of Supplementary note 16 to Supplementary note 23, wherein said status notifying means notifies said status at anyone of a periodical timing of the collection and/or the reporting of said measurement information, a timing of the collection and/or the reporting of said measurement information by a predetermined trigger, a timing pre-configured by said radio network, and a timing in which a predetermined event for notifying said status has occurred.

(Supplementary note 25) A radio terminal according to one of Supplementary note 16 to Supplementary note 24, wherein said status notifying means indicates a measurement method and/or a reporting method of said measurement information, or instructs an abort of the measurement and/or the reporting when notifying said status.

(Supplementary note 26) A radio terminal according to one of Supplementary note 16 to Supplementary note 25, wherein said radio network includes at least one of a radio base station, a base station controller, a DM (Device Manager), and an NM (Network Manager).

(Supplementary note 27) A radio communication method according to one of Supplementary note 16 to Supplementary note 26, comprising transmitting said status for a purpose of determining whether or not the reconfiguration of the configuration information.

(Supplementary note 28) A radio communication method according to one of Supplementary note 16 to Supplementary note 27, comprising transmitting said status for a purpose of considering a situation of the radio terminal.

(Supplementary note 29) A radio communication method according to one of Supplementary note 16 to Supplementary note 28, comprising transmitting said status for a purpose of considering a situation related to the information collection by the radio terminal.

(Supplementary note 30) A radio terminal in a communication system for controlling, by a radio network, at least one of collection of measurement information and reporting of said measurement information to the radio network by the radio terminal, comprising a status notifying means that notifies a status related to at least one of the collection and the reporting of said measurement information by its own terminal to said radio network.

(Supplementary note 31) A radio communication method, comprising:

notifying a radio terminal of configuration information related to at least one of collection of measurement information and reporting of said measurement information to a radio network by the radio terminal;

notifying said radio network of a status related to at least one of the collection and the reporting of said measurement information by said radio terminal; and receiving said status and determining whether or not to reconfigure said configuration information.

(Supplementary note 32) A radio communication method according to Supplementary note 31, wherein said status is at least one of information related to a situation of the radio terminal and information related to a collection situation of the measurement information.

(Supplementary note 33) A radio communication method according to Supplementary note 31 or Supplementary note 32, comprising transmitting said status for a purpose of reconfiguring said configuration information.

(Supplementary note 34) A radio communication method according to one of Supplementary note 31 to Supplementary note 33, comprising executing at least one of said collection and said reporting with the reconfigured configuration information.

(Supplementary note 35) A radio communication method according to one of Supplementary note 32 to Supplementary note 34, wherein said information related to the situation of the radio terminal is at least one of a remaining battery charge of the radio terminal, location information of the radio terminal, received strength of a positioning radio wave (GPS radio wave) at the radio terminal, a communication quality of the radio terminal, and a moving velocity of the radio terminal, or a combination thereof.

(Supplementary note 36) A radio communication method according to one of Supplementary note 32 to Supplementary note 35, wherein said information related to the collection situation of the measurement information is at least one of a sort of the measurement information collected by the radio terminal, an amount of the measurement information collected by the radio terminal, a summary of the measurement information collected by the radio terminal, and positioning performance information of the radio terminal, or a combination thereof.

(Supplementary note 37) A radio communication method according to Supplementary note 36, wherein said summary of the measurement information is at least one of said sort of the measurement information, for each sort of said measurement information, a number of the measurement, a measurement time, and location information of the radio terminal at a point in time when the measurement has been performed, or a combination thereof.

(Supplementary note 38) A radio communication method according to one of Supplementary note 31 to Supplementary note 37, comprising reconfiguring at least one of an interval of the collection of said measurement information and/or the reporting of said measurement information, a trigger of the collection of said measurement information and/or the reporting of said measurement information, a sort of said measurement information to be collected and/or a sort of said measurement information to be reported, and a collection amount of said measurement information and/or an amount of said measurement information to be reported, or a combination thereof.

(Supplementary note 39) A radio communication method according to one of Supplementary note 31 to Supplementary note 38, comprising notifying said status at anyone of a periodical timing of the collection and/or the reporting of said measurement information, a timing of the collection and/or the reporting of said measurement information by a predetermined trigger, a timing pre-configured by said radio network, and a timing in which a predetermined event for notifying said status has occurred.

(Supplementary note 40) A radio communication method according to one of Supplementary note 31 to Supplementary note 39, comprising indicating a measurement method and/or a reporting method of said measurement information, or instructing an abort of the measurement and/or the reporting when notifying said status.

(Supplementary note 41) A radio communication method according to one of Supplementary note 31 to Supplementary note 40, wherein said radio network includes at least one of a radio base station, a base station controller, a DM (Device Manager), and an NM (Network Manager).

(Supplementary note 42) A radio communication method according to one of Supplementary note 31 to Supplementary note 41, comprising transmitting said status for a purpose of determining whether or not the reconfiguration of the configuration information.

(Supplementary note 43) A radio communication method according to one of Supplementary note 31 to Supplementary note 42, comprising transmitting said status for a purpose of considering a situation of the radio terminal.

(Supplementary note 44) A radio communication method according to one of Supplementary note 31 to Supplementary note 43, comprising transmitting said status for a purpose of considering a situation related to the information collection by the radio terminal.

(Supplementary note 45) A radio communication method, comprising:

notifying a status related to at least one of collection and reporting of measurement information by a radio terminal to a radio network; and receiving said status, and controlling at least one of the collection of the measurement information and the reporting of said measurement information to the radio network by said radio terminal.

(Supplementary note 46) A radio network, comprising:

configuration notifying means that notifies a radio terminal of configuration information related to at least one of collection of measurement information and reporting of said measurement information to a radio network by the radio terminal; and reconfiguring means that receives, from said radio terminal, a status related to at least one of the collection and the reporting of said measurement information by said radio terminal, and determines whether or not to reconfigure said configuration information.

(Supplementary note 47) A program for causing an information processing device to execute the processes of:

notifying a radio terminal of configuration information related to at least one of collection of measurement information and reporting of said measurement information to a radio network by the radio terminal;

receiving from said radio terminal a status related to at least one of the collection and the reporting of said measurement information by said radio terminal; and receiving said status, and determining whether or not to reconfigure said configuration information.

REFERENCE SIGNS LIST 1 radio terminal (UE)
2 radio network
11 logging/reporting capability memory
12 terminal situation/log situation reporting function
13 measuring & measurement result logging function
14 measurement reporting function
21 OAM policy & OAM requirement enforcement function
22 log storage function
30 radio terminal
31 radio base station 32 NM
600 UE (DM client)
601 DM server
602 NM

The invention claimed is:

1. A radio communication system comprising a radio terminal and a radio network,
wherein the radio network comprises:
a transmitter configured to transmit an instruction to periodically log measurement results of received quality of downlink signals and a duration to maintain the measurement results to the radio terminal; and
wherein the radio terminal comprises:
at least one processor;
a memory coupled to the at least one processor;
wherein the at least one processor is configured to implement:
a controller configured to store measurement information containing the measurement results as a measurement log into the memory; and
a notifier configured to notify the radio network of availability information indicating that the measurement log stored in the memory is able to be obtained by the radio network; and
wherein the radio terminal further comprises:
a receiver configured to receive a report request for requesting a report on the measurement log from the radio network; and
a transmitter configured to transmit the measurement results of the received quality, time information for each of the measurement results of the received quality, and location information of the radio terminal to the radio network as the measurement log.

2. The radio communication system according to claim 1, wherein the measurement log includes at least any one of a random access failure, a broadcast channel failure, a paging channel failure, and information of the outdoors/indoors.

3. A radio terminal comprising:
a receiver configured to receive an instruction to periodically log measurement results of received quality of downlink signals and a duration to maintain the measurement results from a radio network;
at least one processor;
a memory coupled to the at least one processor;
wherein the at least one processor is configured to implement:
a controller configured to store the measurement information containing the measurement results as a measurement log; and
a notifier configured to notify the radio network of availability information indicating that the measurement log stored in the memory is able to be obtained by the radio network; and
wherein the radio terminal further comprises:
a receiver configured to receive a report request for requesting a report on the measurement log from the radio network; and
a transmitter configured to transmit the measurement results of the received quality, time information for each of the measurement results of the received quality, and location information of the radio terminal to the radio network as the measurement log.

4. The radio terminal according to claim 3, wherein the measurement log includes at least any one of a random access failure, a broadcast channel failure, a paging channel failure, and information of the outdoors/indoors.

5. A communication method using a radio terminal configured to transmit measurement information to a radio network, comprising:
receiving an instruction to periodically log measurement results of received quality of downstream signals and a duration to maintain the measurement results from the radio network;
storing, into a memory, the measurement information containing the measurement results as a measurement log;
notifying the radio network of availability information indicating that the measurement log stored in the memory is able to be obtained by the radio network;
receiving a report request for requesting a report on the measurement log from the radio network; and
transmitting the measurement results of the received quality, time information for each of the measurement results of the received quality, and location information of the radio terminal to the radio network as the measurement log.

6. The communication method according to claim 5, wherein the measurement log includes at least any one of a random access failure, a broadcast channel failure, a paging channel failure, and information of the outdoors/indoors.

7. A radio station communicable with a radio terminal, comprising:
at least one processor;
a memory coupled to the at least one processor;
a receiver; and
a transmitter,
wherein the at least one processor is configured to:
control the transmitter to transmit an instruction to periodically log measurement results of received quality of downstream signals and a duration to maintain the measurement results to the radio terminal;
control the receiver to receive, from the radio terminal, availability information indicating that a measurement log stored in the radio terminal is able to be obtained by the radio network, wherein the measurement log is measurement information comprising the measurement results;
control the transmitter to transmit a report request for requesting a report on the measurement log to the radio terminal; and
control the receiver to receive measurement results of received quality, time information for reach of the measurement results of the received quality, and location information of the radio terminal from the radio terminal as the measurement log.

8. The radio station according to claim 7, wherein the measurement log includes at least any one of a random access failure, a broadcast channel failure, a paging channel failure, and information of the outdoors/indoors.

9. A communication method using a radio station communicable with a radio terminal, comprising:
transmitting an instruction to periodically log measurement results of received quality of downstream signals and a duration to maintain the measurement results to the radio terminal;
receiving, from the radio terminal, availability information indicating that a measurement log stored in the radio terminal is able to be obtained by the radio network, wherein the measurement log is measurement information comprising the measurement results;
transmitting a report request for requesting a report on the measurement log to the radio terminal; and receiving measurement results of received quality, time information for each of the measurement results of the received quality, and location information of the radio terminal from the radio terminal as the measurement log.

10. The communication method according to claim 9, wherein the measurement log includes at least any one of a random access failure, a broadcast channel failure, a paging channel failure, and information of the outdoors/indoors.

11. The radio communication system according to claim 1, wherein the availability information does not include the measurement log.

12. The radio terminal according to claim 3, wherein the availability information does not include the measurement log.

13. The communication method according to claim 5, wherein the availability information does not include the measurement log.

14. The radio communication system according to claim 7, wherein the availability information does not include the measurement log.

\* \* \* \* \*